(12) United States Patent
Kobayashi et al.

(10) Patent No.: US 8,589,651 B2
(45) Date of Patent: Nov. 19, 2013

(54) METHOD FOR SUPPORTING MIGRATION DESTINATION DECISION AND MANAGEMENT SYSTEM

(75) Inventors: Masakazu Kobayashi, Yokohama (JP); Tatsundo Aoshima, Yokohama (JP); Yasufumi Uchiyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 506 days.

(21) Appl. No.: 13/001,725

(22) PCT Filed: Oct. 7, 2010

(86) PCT No.: PCT/JP2010/067671
§ 371 (c)(1),
(2), (4) Date: Dec. 28, 2010

(87) PCT Pub. No.: WO2012/046328
PCT Pub. Date: Apr. 12, 2012

(65) Prior Publication Data
US 2012/0089548 A1    Apr. 12, 2012

(51) Int. Cl.
*G06F 12/00* (2006.01)
(52) U.S. Cl.
USPC .......... 711/165; 711/114; 711/E12.002
(58) Field of Classification Search
None
See application file for complete search history.

(56) References Cited

U.S. PATENT DOCUMENTS

| | | | |
|---|---|---|---|
| 7,243,094 B2 * | 7/2007 | Tabellion et al. | 1/1 |
| 7,831,695 B1 * | 11/2010 | Burr et al. | 709/220 |
| 7,882,123 B2 * | 2/2011 | Tabellion et al. | 707/764 |
| 7,937,420 B2 * | 5/2011 | Tabellion et al. | 707/822 |
| 8,001,089 B2 * | 8/2011 | Tabellion et al. | 707/674 |
| 2001/0054133 A1 | 12/2001 | Murotani et al. | |
| 2006/0143418 A1 | 6/2006 | Takahashi et al. | |
| 2006/0218367 A1 | 9/2006 | Ukai et al. | |
| 2008/0091898 A1 | 4/2008 | Takahashi et al. | |
| 2010/0250746 A1 * | 9/2010 | Murase | 709/226 |

FOREIGN PATENT DOCUMENTS

| | | |
|---|---|---|
| JP | 2001-337790 | 12/2001 |
| JP | 2006-099748 | 4/2006 |
| JP | 2006-268398 | 10/2006 |

OTHER PUBLICATIONS

PCT International Search Report and Written Opinion on application No. PCT/JP2010/067671 dated Nov. 2, 2010; 5 pages.

* cited by examiner

*Primary Examiner* — Kevin Verbrugge
(74) *Attorney, Agent, or Firm* — Foley & Lardner LLP

(57) ABSTRACT

Each time data is migrated, a management system stores information denoting a migration history related to the migration of the data, in history management information. The management system receives an input of an administrator-desired attribute condition combination for a migration-destination storage device, identifies all device attribute combinations conforming to this attribute condition combination, and calculates multiple migration trends based on each device attribute combination and the history management information. The management system identifies, from among the multiple migration trends, a migration trend to which a specified migration-source storage device belongs, and displays information denoting at least this identified migration trend.

15 Claims, 18 Drawing Sheets

| ORIGIN IDENTI-FIER | MG-SOURCE STORAGE TYPE | MG-SOURCE STORAGE IDENTIFIER | MG-SOURCE VOLUME IDENTIFIER | MG-DESTINATION STORAGE TYPE | MG-DESTINATION STORAGE IDENTIFIER | MG-DESTINATION VOLUME IDENTIFIER | EXECUTION DATE/TIME |
|---|---|---|---|---|---|---|---|
| 1 | USP_V | 14015 | 00:1C:03 | DF800 | 85011487 | 00:82 | 2009/8/1 |
| 1 | DF800 | 85011487 | 00:82 | DF600 | 68010116 | 51 | 2010/1/23 |
| 2 | USP_V | 14015 | 01:1F:05 | USP | 10315 | 03:1F:05 | 2008/9/1 |
| 2 | USP | 10315 | 03:1F:05 | DF700 | 77010132 | 00:04 | 2009/4/5 |
| 2 | DF700 | 77010132 | 00:04 | DF500 | 1998 | 34 | 2010/3/8 |
| 3 | USP | 10315 | 01:2C:05 | USP | 10315 | 01:3C:06 | 2009/11/3 |
| 3 | USP | 10315 | 03:3C:06 | DF800 | 14015 | 00:6E:06 | 2010/1/4 |
| 4 | DF800 | 85011487 | 04:10 | DF600 | 68010116 | 68 | 2010/5/16 |

| 501 | 502 | 503 | 504 | 505 | 506 2022 |
|---|---|---|---|---|---|
| STORAGE TYPE | STORAGE IDENTIFIER | VOLUME IDENTIFIER | MEDIA TYPE | RAID Level | CAPACITY (KB) |
| USP_V | 14015 | 00:1C:03 | SSD | RAID6 | 1024000 |
| USP_V | 85011487 | 00:1C:03 | SATA | RAID6 | 1024000 |
| DF800 | 14015 | 01:1F:05 | SATA | RAID5 | 4096000 |
| DF800 | 10315 | 03:1F:05 | SAS | RAID6 | 102400 |
| DF800 | 770101132 | 03:1C:04 | SAS | RAID5 | 134421 |
| USP | 10315 | 03:2C:05 | SAS | RAID1+0 | 1024 |
| USP | 10315 | 03:2C:05 | SATA | RAID6 | 1024000 |
| USP | 85011487 | 00:3E:06 | SATA | RAID5 | 4096000 |

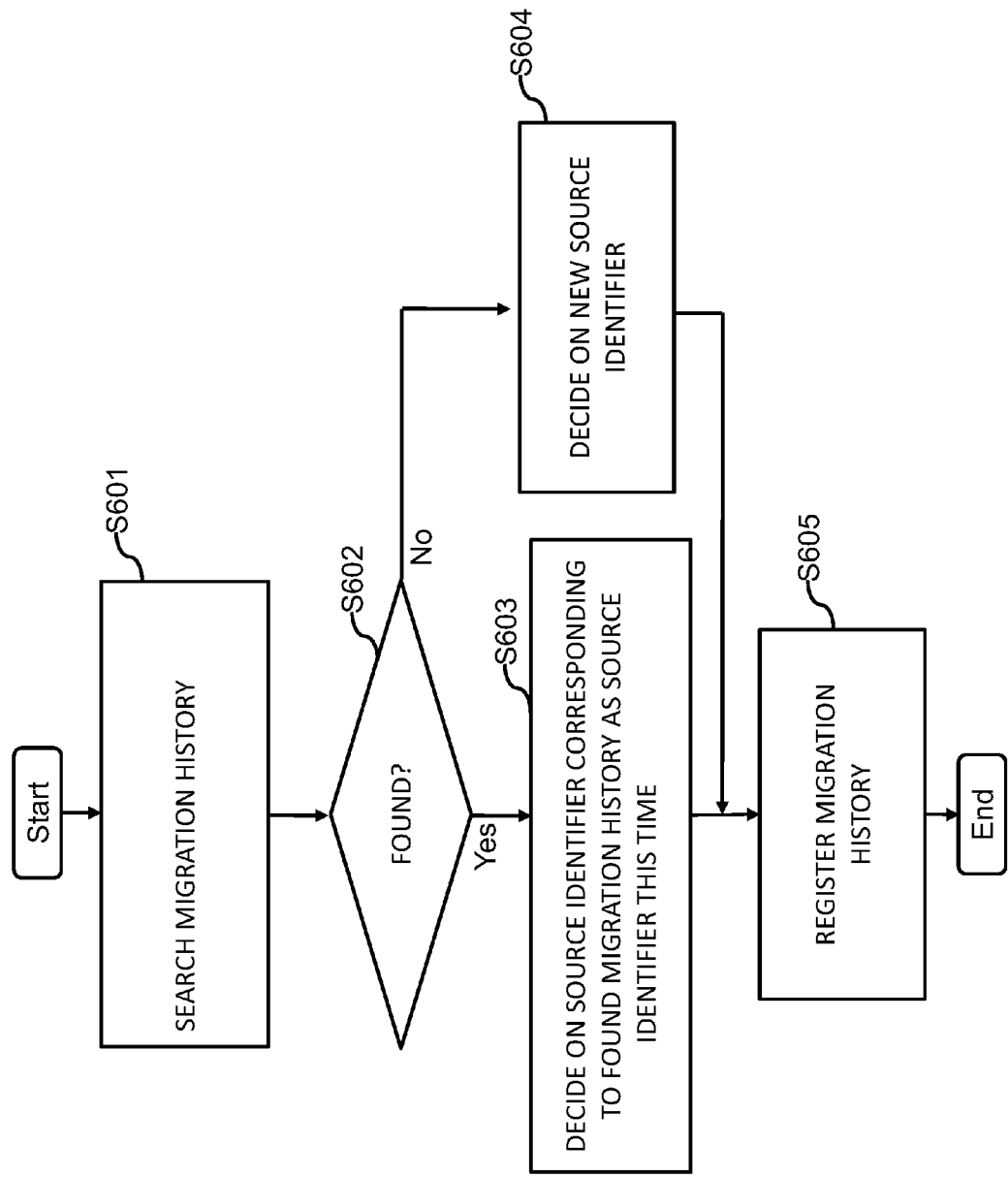

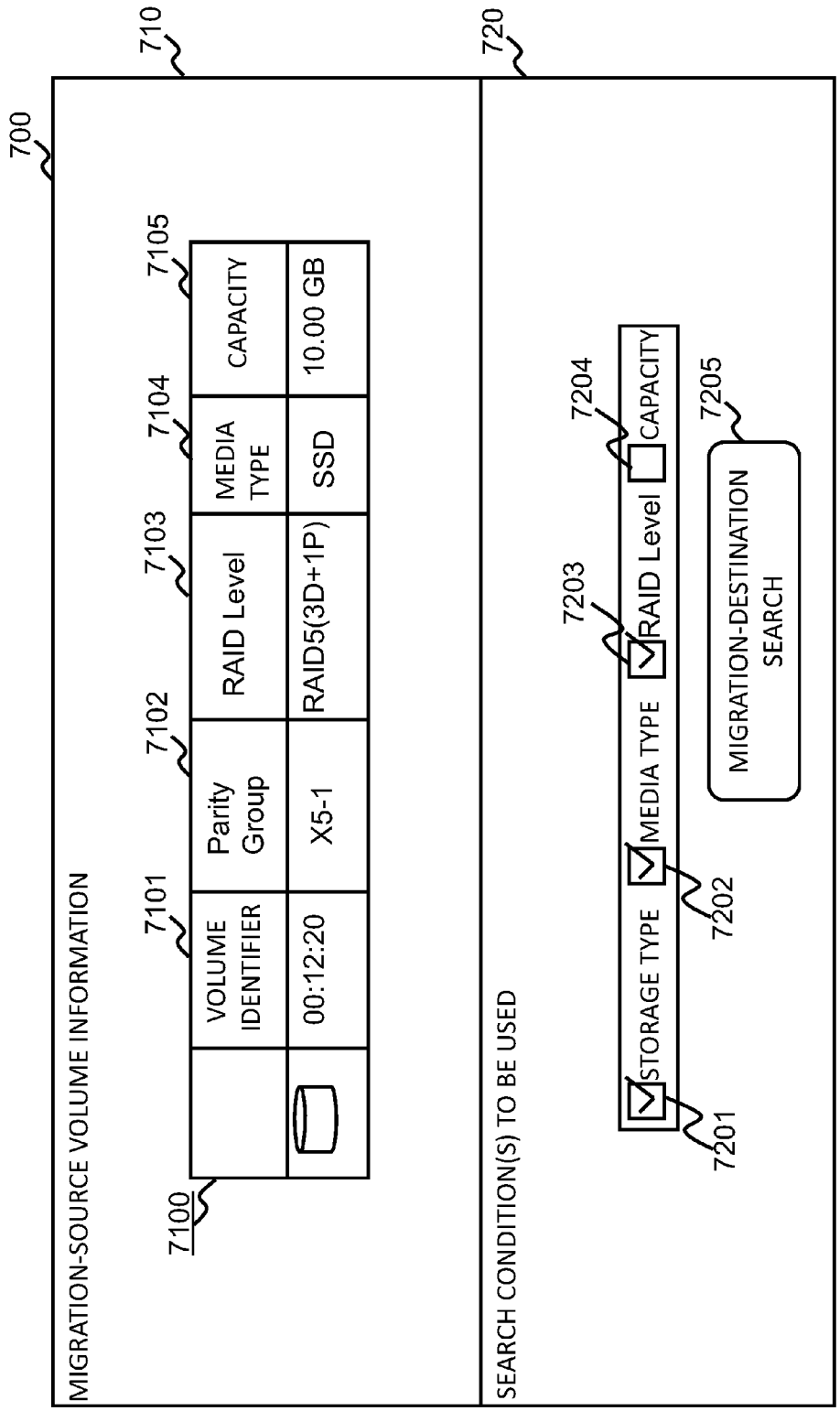

FIG.8

| ID | STORAGE TYPE | MEDIA TYPE | RAID Level | MG-SOURCE SPECIFICATION FREQUENCY | MG-DESTINATION SPECIFICATION FREQUENCY | MG TREND RANKING | LAST MG EXECUTION DATE/TIME |
|---|---|---|---|---|---|---|---|
| 1 | USP_V | SSD | RAID6 | 30 | 0 | 1 | 2009/8/1 |
| 2 | USP_V | SSD | RAID5 | 28 | 1 | 2 | 2010/1/23 |
| 3 | USP_V | SAS | RAID6 | 25 | 3 | 3 | 2008/9/1 |
| 4 | USP_V | SAS | RAID5 | 21 | 5 | 4 | 2009/4/5 |
| 5 | USP | SAS | RAID6 | 21 | 9 | 5 | 2010/3/8 |
| 6 | USP | SAS | RAID5 | 17 | 13 | 6 | 2009/8/1 |
| 7 | USP | SAS | RAID1+0 | 15 | 16 | 7 | 2010/1/23 |
| 8 | USP | SATA | RAID6 | 14 | 19 | 8 | 2008/9/1 |
| 9 | USP | SATA | RAID5 | 14 | 21 | 9 | 2009/4/5 |
| 10 | DF800 | SAS | RAID6 | 8 | 23 | 10 | 2009/8/1 |
| 11 | DF800 | SAS | RAID5 | 5 | 25 | 11 | 2010/1/23 |
| 12 | DF800 | SAS | RAID1+0 | 3 | 28 | 12 | 2008/9/1 |
| 13 | DF800 | SATA | RAID6 | 1 | 30 | 13 | 2009/4/5 |
| 14 | DF800 | SATA | RAID5 | 0 | 32 | 14 | 2010/3/8 |

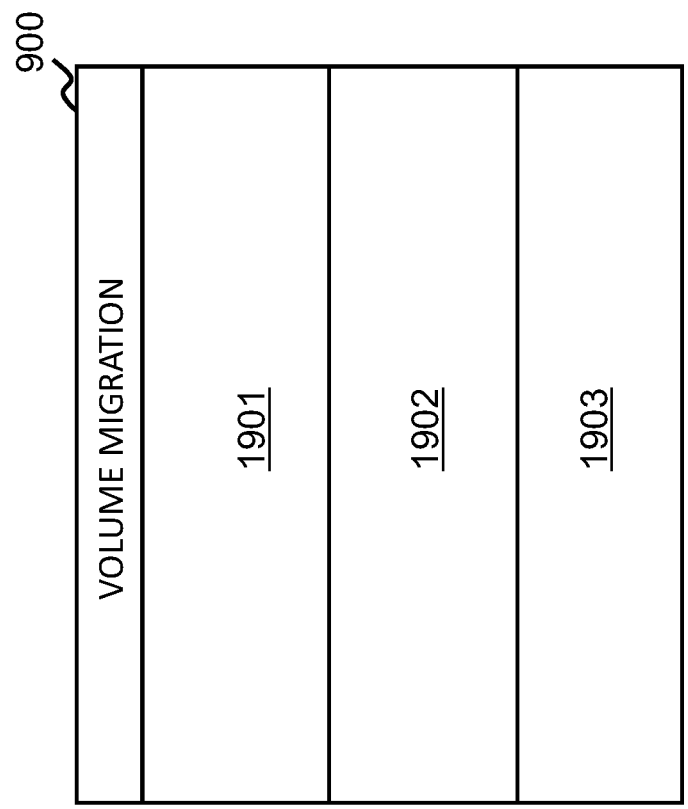

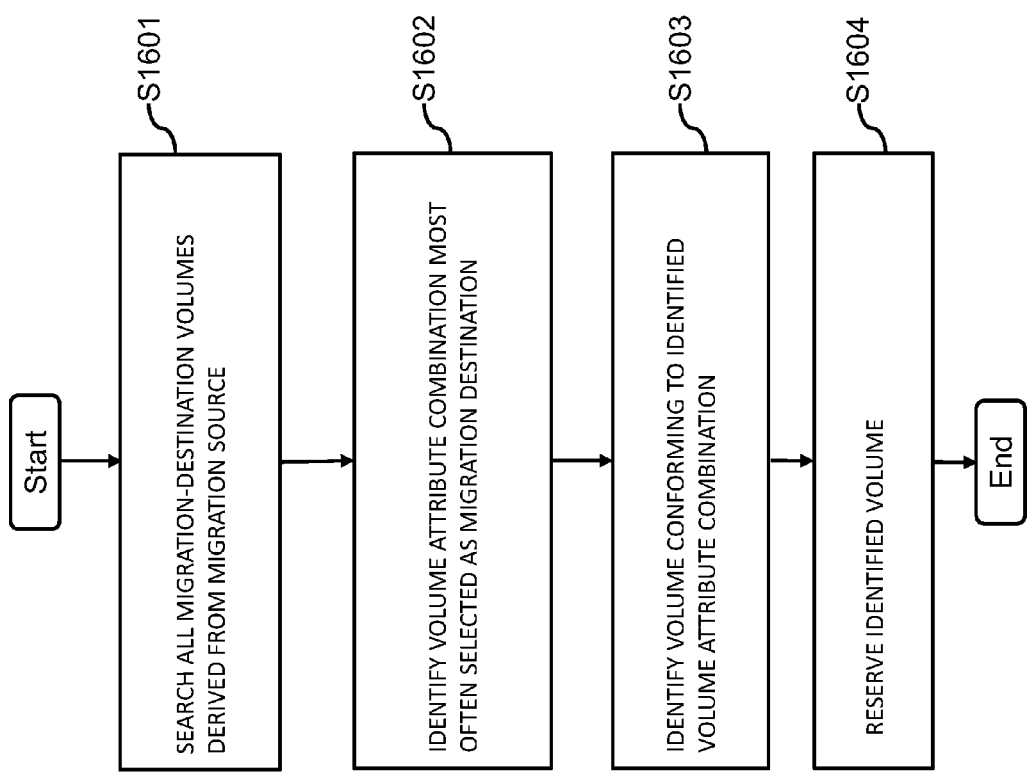

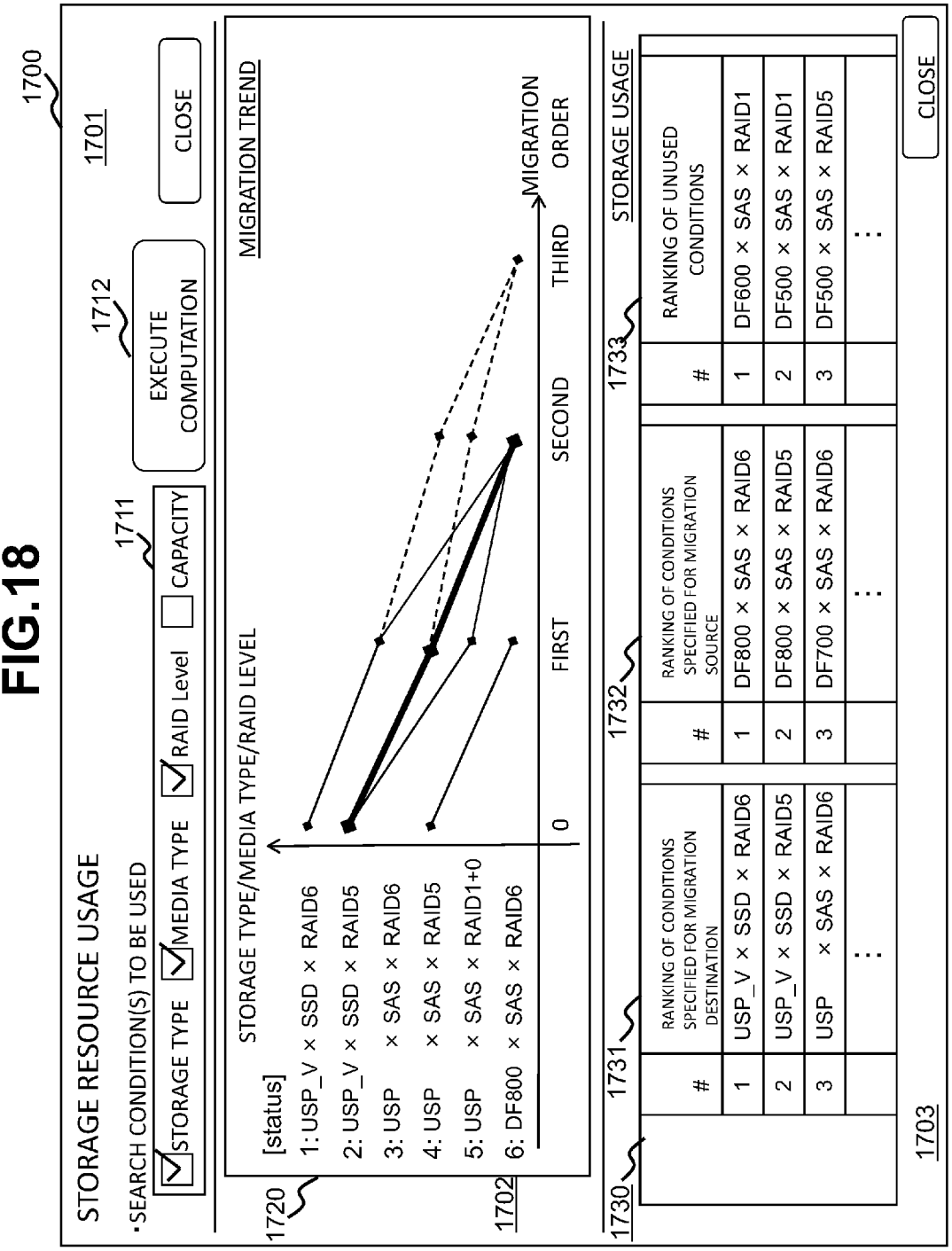

METHOD FOR SUPPORTING MIGRATION DESTINATION DECISION AND MANAGEMENT SYSTEM

TECHNICAL FIELD

The present invention relates to support for deciding on a migration destination.

BACKGROUND ART

A storage system comprises multiple logical volumes (hereinafter, volumes). Volume migration takes place in the storage system. In a volume migration, data in one volume is migrated to another volume. For example, according to Patent Literature 1, data of high importance is migrated to a volume that is based on an expensive, reliable physical storage device, and data of low importance is migrated to a volume that is based on an inexpensive, low reliability physical storage device.

CITATION LIST

Patent Literature

[PTL 1]
US Patent Application Publication No. 2008/0091898

SUMMARY OF INVENTION

Technical Problem

In the above-mentioned prior art, in order to perform volume migration, an administrator must operate a management system to carry out the following tasks:
  Check a condition (s) of a migration-source volume (may include the condition (s) of a parity group on which this volume is based);
  determine the condition(s) of a migration-destination volume based on the condition(s) of the migration-source volume;
  search for a volume that conforms to the determined condition(s) (a volume to use as the migration destination); and
  instruct the storage system to migrate the data in the migration-source volume to any of one or more volumes that have been found.
  In the above-mentioned prior art, the administrator must determine the condition(s) of a volume to be used as the migration destination (the migration destination condition(s)) for each migration-source volume, search for a volume that conforms to the condition(s), and decide on a migration destination based on one or more volumes that have been found. For this reason, in a case where there are multiple migration destination conditions for one migration-source volume, the administrator must search for a migration destination for each migration destination condition, and, in addition, must decide on a migration-destination volume on the basis of multiple search results. This places a considerable burden on the administrator.
  Furthermore, in the above-mentioned prior art, a migration-destination condition is generally specified as a numerical value (for example, an access frequency (for example, in units of "IOPS (Input Output Per Second)") or capacity). For this reason, it is difficult to search for a migration-destination volume that has as the migration destination condition a volume attribute that is not expressed as a numerical value (for example, the type of the storage system comprising the migration-destination volume, or the type of the physical storage device on which the migration-destination volume is based).
  The above problem may also exist for a data migration in storage device units other than a volume-unit migration, for example, a migration in units of parity groups (a group, which comprises multiple physical storage devices, and stores data in accordance with a prescribed RAID (Redundant Array of Independent (or Inexpensive) Disks) level.
  Therefore, an object of the present invention is to enable a non-quantifiable condition to be used as a migration-destination condition, and, in addition, to make it possible to reduce the burden on the administrator for deciding on a migration destination even in a case where there are multiple migration-destination conditions.

Solution to Problem

A management system comprises a communication interface apparatus, a storage resource, and a processor that is coupled to these components. The communication interface is coupled to one or more storage systems comprising multiple storage devices. The storage resource stores history management information including information denoting multiple migration histories, and storage device management information including information denoting multiple device attributes of each storage device. The processor performs processing (A) through (G) below:
(A) includes, each time data is migrated from a migration-source storage device in the one or more storage systems to a migration-destination storage device in the one or more storage systems, information serving as information denoting a migration history related to this data migration and comprising origin identification information which is identification information corresponding to a migration origin being a storage device that is a migration source at the time of a first migration of this data, information related to a migration-source storage device of this data migration, and information related to a migration-destination storage device of this data migration, in the history management information;
(B) specifies the migration-source storage device;
(C) receives an input of a combination of attribute conditions, which are conditions related to one or more administrator-desired device attributes, for the migration-destination storage device;
(D) identifies, based on the storage device management information, all device attribute combinations, which are one or more device attributes that conform to the attribute condition combination that has been inputted in the (C);
(E) calculates, based on the history management information and all of the device attribute combinations identified in the above (D), migration trends denoting that migrations have been carried out from one or more storage devices that conform to one of the device attribute combinations to one or more storage devices that conform to another one of the device attribute combinations, for multiple migration origins;
(F) identifies, from among multiple migration trends calculated for the multiple migration origins, a migration trend to which the specified migration-source storage device belongs, based on the multiple migration trends, the device attribute combination of the specified migration-source storage device, and the migration history related to the migration-source storage device, which is identified from the history management information; and (G) displays information denoting at least the migration trend identified in the (F) from among the multiple migration trends.

BRIEF DESCRIPTION OF DRAWINGS

FIG. 4 shows a history management table 2023.

FIG. 5 shows the configuration of a volume management table 2022.

FIG. 6 is a flowchart showing the flow of processing for storing a migration history.

FIG. 7 shows a search execution screen.

FIG. 8 shows the configuration of a migration destination inference table.

FIG. 9 shows the overall configuration of a search result screen.

FIG. 17 is a flowchart showing the flow of processing of a volume advanced reservation process.

FIG. 18 shows a usage presentation screen.

DESCRIPTION OF THE EMBODIMENTS

Figure 1:
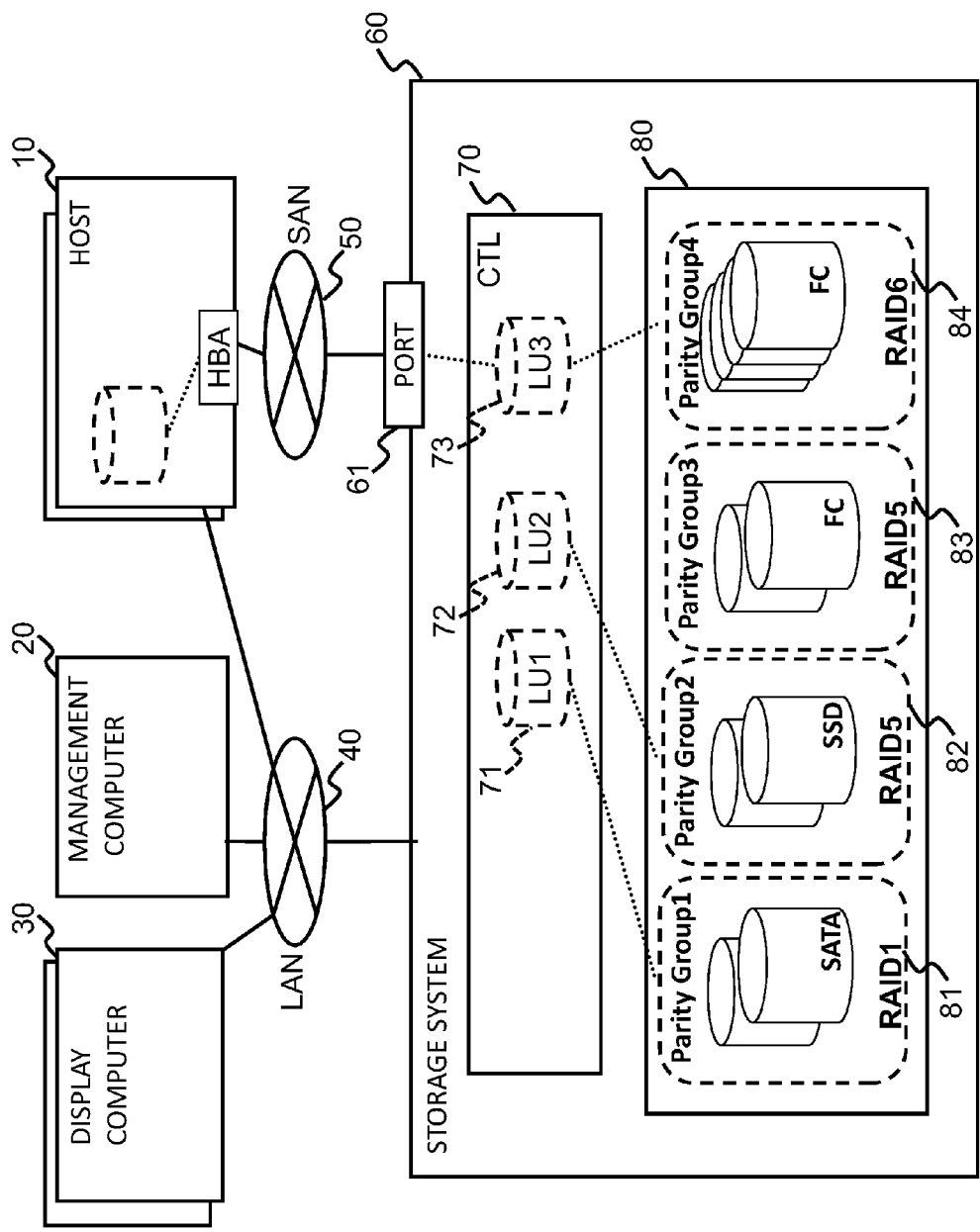
FIG. 1 shows the configuration of a computer system related to an embodiment of the present invention.

The embodiment of the present invention will be explained hereinbelow by referring to the drawings. Furthermore, in the following explanation, various types of information may be explained using the expression "xxx table," but the various information may also be expressed using a data structure other than a table. Also, "xxx table" may be called "xxx information" to show that the various information is not dependent on the data structure.

In the following explanation, ID (identifier) is used to identify elements, but either a name or a numeral may be used as identification information instead of ID.

Furthermore, the management system may comprise one or more computers. Specifically, for example, in a case where either a management computer displays information or the management compute sends display information to a remote computer, the management computer is the management system. Also, for example, in a case where functions equivalent to those of the management computer are realized using multiple computers, the relevant multiple computers (may include a display computer in a case where a computer for display use carries out displays) are the management system.

Furthermore, in the following explanation, there may be cases where the processing is explained using a "program" as the subject, but since the stipulated processing can be performed in accordance with a program being executed by a processor (for example, a CPU (Central Processing Unit)) while using a storage resource (for example, a memory) and/or a communication interface (for example, a communication port) as needed, the processor may also be used as the subject of the processing. Processing explained using the program as the subject may be processing carried out by the management computer. The processor may comprise a hardware circuit that carries out either part or all of the processing performed by the processor. A computer program may be installed in respective computers from a program source. The program source, for example, may be either a program delivery server or a storage medium.

In the following embodiment, unless otherwise noted, it is supposed that a data migration is carried out in volume units. That is, in the following embodiment, it is supposed that volume migrations are carried out.

Volume migration and migration will be abbreviated as "MG" in the drawings below.

FIG. 1 shows the configuration of a computer system related to an embodiment of the present invention.

The computer system comprises a business computer (hereinafter, the host) 10, a management computer 20, a display computer 30, and a storage system 60. Furthermore, there may be either one or multiple of each of the host 10, the management computer 20, the display computer 30, and the storage system 60. At least one of the host 10, the management computer 20 and the display computer 30 may be integrally configured. In this embodiment, the management system comprises the management computer 20 and the display computer 30.

The host 10, the management computer 20 and the display computer 30 each comprise a communication interface, a storage resource, and a processor to which these are coupled. The display computer 30 additionally comprises a display apparatus and input/output apparatuses (for example, a keyboard and a pointing device). The display apparatus and the input/output apparatuses may be integrated.

The host 10 and the storage system 60 are interconnected via a SAN (Storage Area Network) 50. The host 10 is also coupled to the management computer 20 and the display computer 30 via a LAN (Local Area Network) 40. Another type of communication network may be employed instead of at least one of the SAN 50 or the LAN 40. The SAN 50 and the LAN 40 may also be integrated. The storage system 60 comprises a CTL (ConTroLler) 70 and a storage part 80.

The storage part 80 comprises multiple physical storage devices (hereinafter, media). A disk-type physical storage device (for example, a HDD (Hard Disk Drive)) and a flash memory device (for example, a SSD (Solid State Drive)) may be employed as the media. In the example shown in FIG. 1, the storage part 80 comprises four parity groups 81 through 84. A parity group may also be called a RAID group. The parity group comprises two or more physical storage devices, and stores data in accordance with a prescribed RAID level. The respective parity groups 81 through 84 are as follows.

Parity group 1 (81) is a RAID level 1 group comprising two SATA (Serial ATA)-HDD (SATA interface HDD).

Parity group 2 (82) is a RAID level 5 group comprising multiple SSD (Solid State Drives).

Parity group 3 (83) is a RAID level 5 group comprising multiple FC (Fibre Channel)-HDD(FC interface HDD).

Parity group 4 (84) is a RAID level 6 group comprising multiple FC-HDD.

The storage part 80 may include media that do not comprise a parity group. A volume may be configured based on media that do not comprise a parity group.

The CTL 70 comprises a communication interface apparatus, a storage resource, and a processor that is coupled to these components. The communication interface apparatus, for example, includes multiple ports 61 that are coupled to the SAN 50, a management I/F (for example, a NIC (Network Interface Card)) that is coupled to the LAN 40, and a disk I/F that is coupled to the media. The storage resource, for example, is a memory (for example, includes a cache area in which data input/output to/from the media is temporarily stored). The processor, for example, is a CPU.

The CTL 70 controls the operation of the storage system 60. For example, the CTL 70 carries out a data read and a date write based on the RAID level of the data write-destination parity group.

Furthermore, the CTL 70 provides the host 10 with multiple volumes (LU (Logical Units)) 71 through 73 based on the parity groups 81 through 84. Either one or multiple volumes are formed based on a single parity group. In the example shown in FIG. 1, a LU 1 (71) is formed based on the parity group 1 (81), a LU 2 (72) is formed based on the parity group 2 (82), and a LU 3 (73) is formed based on the parity group 4 (84).

Figure 2:
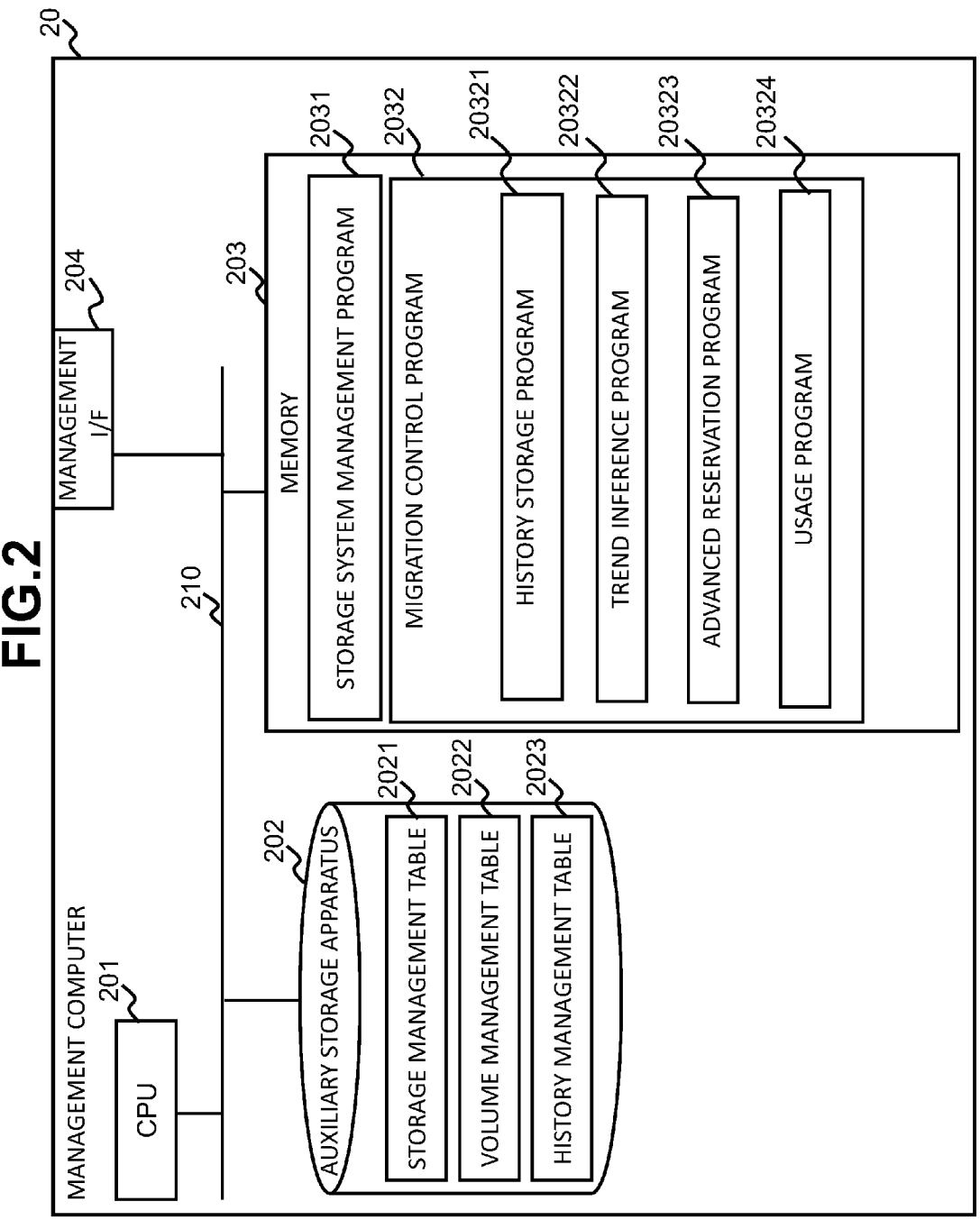
FIG. 2 shows the configuration of a management computer 20.

FIG. 2 shows the configuration of the management computer 20.

The management computer 20 comprises a communication interface apparatus, a storage resource, and a processor that is coupled to these components. The communication interface apparatus, for example, is a management I/F (for example, a NIC) 204 that is coupled to the LAN 40. The storage part includes an auxiliary storage apparatus 202 and a memory 203. The processor is a CPU 201.

The auxiliary storage apparatus 202 stores a storage management table 2021, a volume management table 2022, and a history management table 2023. The storage management table 2021, for example, is information comprising information that denotes which volumes are based on which parity groups. The volume management table 2022 and the history management table 2023 will be explained in detail further below.

The memory 203 stores a storage management program 2031 and a migration control program 2032.

The storage management program 2031 manages the type of media in the storage part 80 of the storage system 60.

The migration control program 2032 comprises a history storage program 20321, a trend inference program 20322, an advanced reservation program 20323, and a usage program 20324. The migration control program 2032 will be explained in detail later.

Figure 3:
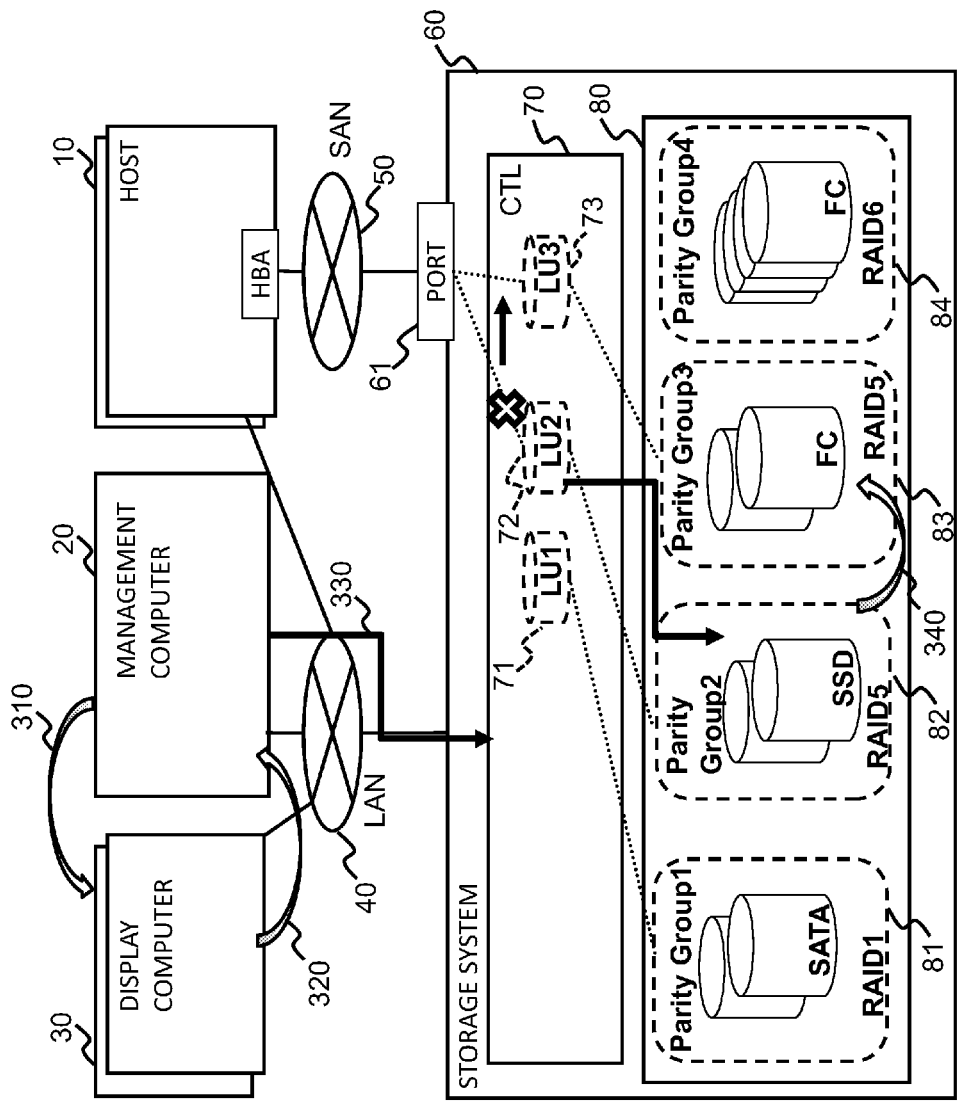
FIG. 3 shows an overview of a volume migration related to an embodiment of the present invention.

FIG. 3 shows an overview of a volume migration related to an embodiment of the present invention.

The management computer infers a migration-destination volume for data from a migration-source volume based on a volume migration trend (hereinafter, the migration trend), and provides information denoting the inferred migration-destination volume to the administrator. Specifically, the management computer 20 displays (arrow 310) on the display computer 30 a GUI (Graphical User Interface) that displays information denoting the inferred migration-destination volume. The management computer 20, upon receiving from the display computer 30 an administrator-desired migration-destination volume specification (arrow 320), sends (arrow 330) a migration instruction to the CTL 70 of the storage system 60 for migrating data from the migration-source volume to the specified migration-destination volume.

The CTL 70 receives the migration instruction from the management computer 30. This migration instruction, according to the example of FIG. 3, specifies LU 2 (72) as the migration-source volume, and specifies LU 3 (73) as the migration-destination volume.

Next, the CTL 70 carries out a volume migration comprising the following processes.

The CTL 70 migrates (arrow 340) data from the media group that is the basis of the migration-source volume (LU 2 (72)) to the media group that is the basis of the migration-destination volume (LU 3 (73)).

After data migration is complete, the CTL 70 associates information (for example a LUN (Logical Unit Number)) that is associated with the LU 2 (72) with the LU 3 (73) instead of the LU 2 (72).

After this volume migration, the host 10 is able to carry out I/O with respect to the migration-destination volume (LU 3 (73)) by sending an I/O request specifying the LUN of the migration-source volume (LU 2 (72)).

The management computer 20 stores a volume migration history. Specifically, the history storage program 20321 registers information related to the history of volume migrations in the history management table 2023 (Refer to FIG. 2). The migration history comprises migration-source volume attribute information and migration-destination volume attribute information.

In a state in which the migration history is being stored (for example, in a state in which the history management table 2023 comprises multiple migration histories), the management computer 20 receives a volume search request from the display computer 30, and, for example, carries out the following operations.

(a) The trend inference program 20322 calculates a migration trend based on a search condition, which is specified in the volume search request, and the history management table 2023. Furthermore, the history management table 2023, in a case where there is no migration history for the volume specified as the migration-source volume (that is, a case in which the volume migration trend of the specified migration-source volume is not clear), infers a migration-destination volume.

(b) The trend inference program 20322 displays the calculated volume migration trend on the display computer 30. Based on this migration trend, the administrator is able to decide on a migration-destination volume.

(c) In a case where the migration-destination volume has been inferred, the trend inference program 20322 displays information denoting the inferred migration-destination volume on the display computer 30.

This embodiment will be explained in detail below.

FIG. 4 shows the configuration of the history management table 2023.

The history management table 2023 is information that is updated by the history storage program 20321. The history management table 2023 comprises the following information for each migration history:

An origin identifier 401, which is the identifier of the point (s) of origin of one or more volume migrations identified from one or more migration histories;

a migration-source storage type 402, which denotes the type of the storage system comprising the migration-source volume;

a migration-source storage identifier 403, which is the identifier of the storage system comprising the migration-source volume;

a migration-source volume identifier 404, which is the identifier of the migration-source volume;

a migration-destination storage type 405, which denotes the type of the storage system comprising the migration-destination volume;

a migration-destination storage identifier 406, which is the identifier of the storage system comprising the migration-destination volume;

a migration-destination volume identifier 407, which is the identifier of the migration-destination volume; and an execution date/time 408, which denotes the date and time at which a volume migration was executed. In this embodiment, the unit "date/time" is year, month and day, but this unit may also comprises at least one of hour, minute, and second.

In accordance with the history management table 2023, the volume where data originated and the volume where this data ultimately migrated is clear from the one or more migration histories with the same origin identifier 401. For example, the two migration histories having the origin identifier 401 of "1" clearly show that the data was ultimately stored in volume "51" of the storage system "68010116" in accordance with the following two volume migrations:

(1) a volume migration from volume "00:1C:03" of storage system "14015" to volume "00:82" of storage system "85011487"; and (2) a volume migration from volume "00:82" of storage system "85011487" to volume "51" of storage system "68010116".

FIG. 5 shows the configuration of the volume management table 2022.

The volume management table 2022 is information comprising information that the storage management program 2031 collected from one or more storage systems 60.

The volume management table 2022 comprises the following information for each volume:

a storage type 501, which denotes the type of the storage system comprising the volume;

a storage identifier 502, which is the identifier of the storage system comprising the volume;

a volume identifier 503, which is the identifier of the volume;

a media type 504, which denotes the type of media comprising the parity group on which the volume is based;

a RAID level 505, which is the RAID level of the parity group on which the volume is based; and a capacity 506, which denotes the capacity of the volume.

For example, according to the row (record) enclosed within the dotted line, the following is clear about the volume with the volume identifier 503 of "00:1F:05".

This volume resides in the storage system having a storage type 501 of "DF800" and a storage identifier 502 of "14015".

This volume is based on a parity group with a RAID level 505 of "RAID 5" comprised from media having a media type 504 of "SATA-HDD".

The capacity of this volume is 4096000 KB.

FIG. 6 is a flowchart showing the flow of processing for storing a migration history.

The history storage program 20321 searches the history management table 2023 for a migration history in which a migration-source volume became the migration destination of another volume (S601).

In a case where the migration history is found (S602: YES), the history storage program 20321 decides on the origin identifier 401 corresponding to the migration history that was found as the origin identifier 401 that will correspond to the migration history to be registered this time around (S603). Then, the history storage program 20321 registers the origin identifier decided in S603 and the migration history comprising the respective attribute information of the migration-source volume and the migration-destination volume of this volume migration in the history management table 2023 (S605).

Alternatively, in a case where the migration history is not found (S602: NO), the history storage program 20321 creates a new origin identifier 401 that does not exist in the history management table 2023 (S604), and registers this origin identifier 401 and the migration history comprising the respective attribute information of the migration-source volume and the migration-destination volume of this volume migration in the history management table 2023 (S605).

The management computer 20 calculates a migration trend. The management computer 20 displays on the display computer 10 a graph showing a migration trend based on the history management table 2023, the volume management table 2022, and the search condition specified by the administrator.

FIG. 7 shows a search execution screen.

The search execution screen 700 is a screen for executing a migration-destination volume search, and is displayed on the display computer 10 by the trend inference program 20322. The search execution screen 700, for example, comprises a migration source display area 710 and a search condition display area 720.

A migration source table 7100 is displayed in the migration source display area 710. The migration source table 7100 comprises a volume identifier 7101, a parity group identifier 7102, a RAID level 7103, a media type 7104, and a capacity 7105 for each migration-source volume that was specified. The information 7101 through 7105 is information that has been identified from the storage management table 2021 and the volume management table 2022. The migration-source volume may be specified by the administrator, or may be specified by the migration control program 2032 in accordance with a prescribed rule.

The search condition display area 720 comprises multiple options (checkboxes 7201 through 7204) that will serve as conditions for searching for a migration-destination volume. This display area 720 also comprises a button 7205 (a migration destination search button) for executing the migration-destination volume search.

The search conditions include various attributes related to a migration-destination volume, such as, for example, a storage type, a media type, a RAID level, and a capacity. The administrator specifies the desired search condition(s) by operating the input apparatus of the display computer 10 and entering a checkmark in the checkbox corresponding to a desired search condition. According to the display area 720 of FIG. 7, storage type, media type 7202, and RAID level have been specified as the search conditions.

The administrator, after specifying the desired search condition(s), is able to execute the migration-destination volume search by pressing the migration destination search button 7205.

Furthermore, according to the example shown in FIG. 7, the search condition specification is carried out by the administrator selecting desired options from multiple options (search conditions) prepared in advance, but the search condition(s) may be specified using another method.

FIG. 8 shows the configuration of a migration destination inference table.

The trend inference program 20322 creates a migration destination inference table 800.

The trend inference program 20322 creates the migration destination inference table 800 on the basis of the search condition (s) received from the display computer 10 (the search condition (s) specified by the administrator) (according to the examples of FIGS. 7 and 8, the storage type, the media type, and the RAID level), the history management table 2023, and the volume management table 2022.

The migration destination inference table 800 comprises the following information for each combination of volume attributes that conforms to the administrator-specified combination of search conditions:

- an ID 801, which is the identifier of the volume attribute combination;
- a storage type 802, a media type 803, and a RAID level 804 corresponding to the volume attribute combination;
- a MG source specification frequency 805, which denotes the total number of one or more volumes conforming to the volume attribute combination that have been migration-source volumes;
- a MG destination specification frequency 806, which denotes the total number of one or more volumes conforming to the volume attribute combination that have been migration-destination volumes;
- a MG trend ranking 807, which denotes the ranking of the migration trends that have been decided with respect to the volume attribute combination; and
- a last MG execution date/time 808, which denotes the date and time at which a volume, of the one or more volumes conforming to the volume attribute combination, last became either a migration source or a migration destination.

According to FIG. 8, information, which is a combination of volume attributes that conforms to an administrator-specified combination of search conditions and which denotes all the volume attribute combinations identified from the volume management table 2022 and the history management table 2023, is registered in the table 800. Therefore, the greater the number of search conditions comprising the administrator-specified search condition combination, the larger the number of rows (records) that will comprise the table 800.

The MG trend ranking 807 is ranked according to most MG differences. An MG difference is the difference between the number of times that a volume becomes a migration source and the number of times that this volume becomes a migration destination. The MG difference is calculated by subtracting the MG destination specification frequency 806 from the MG source specification frequency 805.

Figure 10:
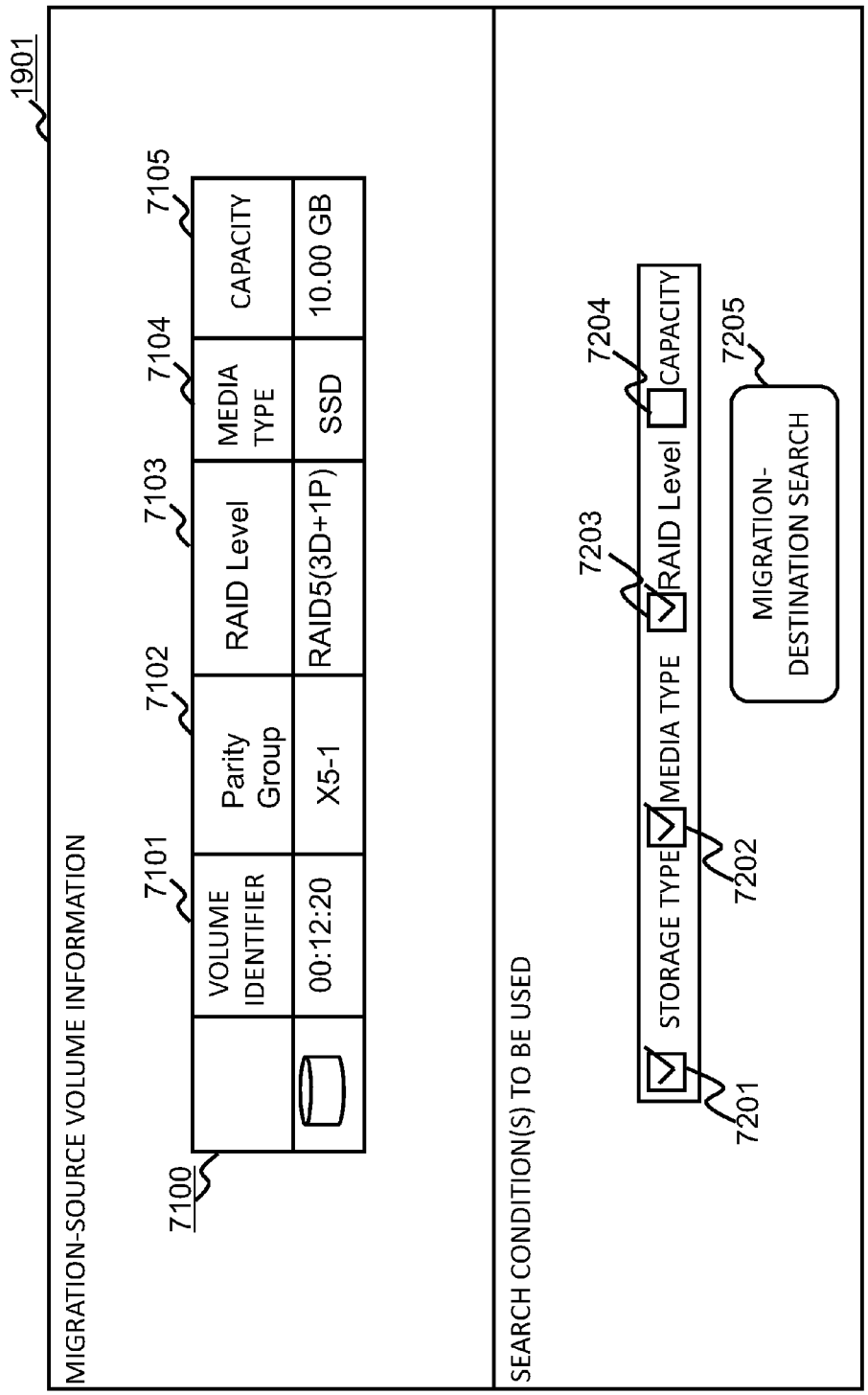
FIG. 10 shows one display area of the search result screen in detail.
Figure 11:
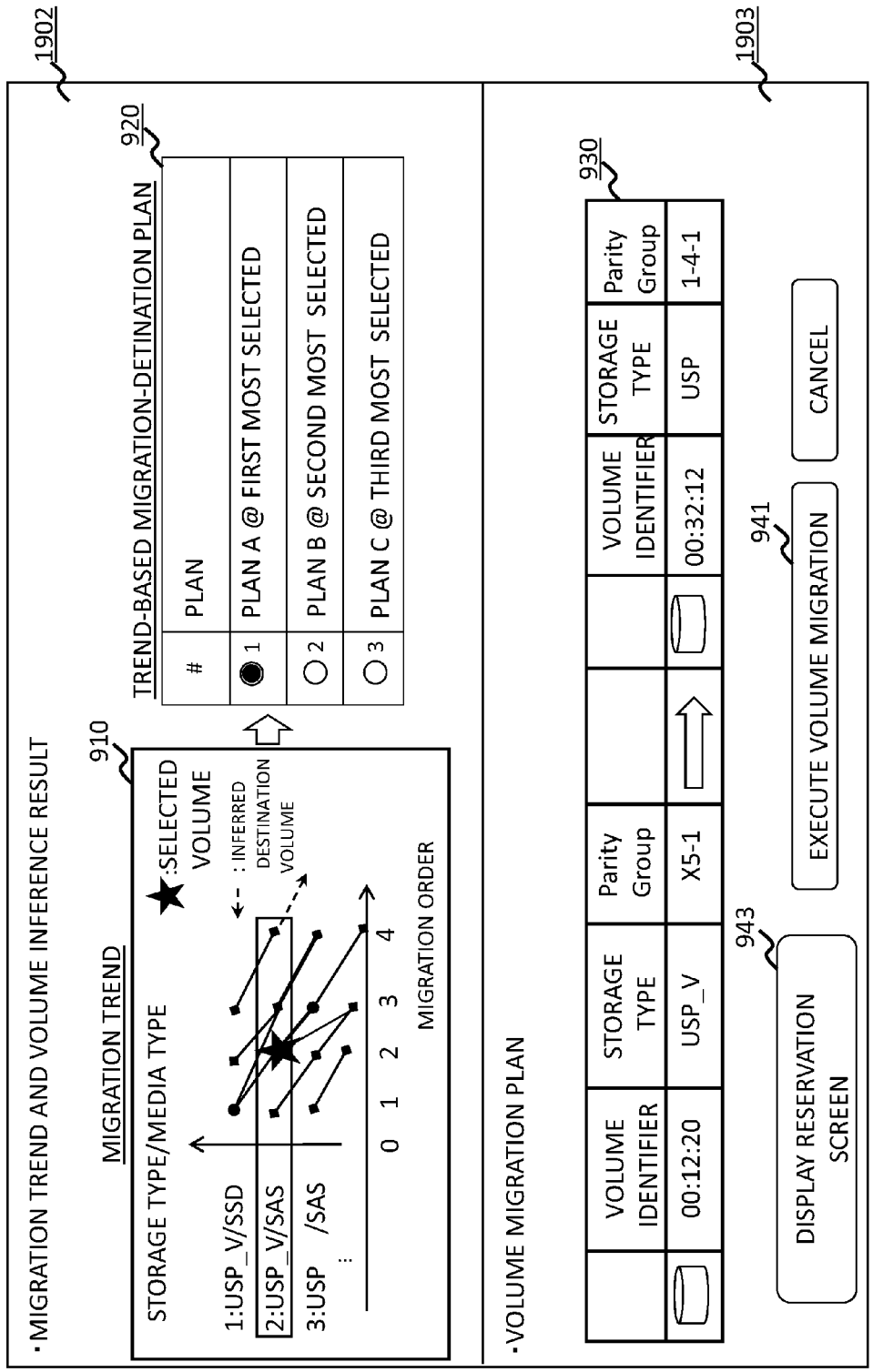
FIG. 11 shows the remaining display area of the search result screen in detail.

FIG. 9 shows the overall configuration of a search result screen, FIG. 10 shows one display area of the search result screen in detail, and FIG. 11 shows the remaining display area of the search result screen in detail.

As shown in FIG. 9, the search result screen 900 comprises a search condition display area 1901, a trend display area 1902, and a plan display area 1903.

The search condition display area 1901, as shown in FIG. 10, is the area in which is displayed information, which is the same as the information displayed in the display areas 710 and 720 shown in FIG. 7. That is, information denoting the specified search condition combination and information denoting the specified migration-source volume are displayed in the display area 1901. In FIG. 10, the specified search condition combination comprises volume type and media type.

In the trend display area 1902, as shown in FIG. 11, a graph (hereinafter, the migration trend graph) 910, which denotes the migration trends calculated in accordance with the migration destination inference table 800 created on the basis of the specified search condition combination, is displayed. Furthermore, a trend-based migration destination plan table 920 is also displayed in the trend display area 1902.

The trend inference program 20322, based on the history management table 2023 and the migration destination inference table 800, calculates a migration trend showing the volume attribute combination-conforming volume where data originated and the volume attribute combination-conforming volume where this data was migrated. The graph denoting this calculated trend is the migration trend graph 910. According to this graph 910, for example, it is clear that each of one or more volumes conforming to the media type "SSD" in the storage type "USP_V" is the origin, and that the data has been migrated to a volume conforming to the media type "SAS" in the storage type "USP_V".

That is, in this embodiment, a "migration trend" shows which of one or more volume attribute-conforming volumes data originated from and which of one or more volume attribute-conforming volumes this data was migrated to. In the graph 910, a polygonal line (including a portion that branches off part way through) extending from one point of origin (a volume attribute combination) expresses one migration trend. That is, there is a migration trend for each volume attribute combination of origin.

According to the calculated migration trend, it is clear from which of one or more volume attribute-conforming volumes to which of one or more volume attribute-conforming volumes data has been migrated. That is, the migration trend expresses a data migration in units of volume attribute combinations rather than volume units. Accordingly, in the following explanation, in a data migration from a first volume attribute combination-conforming one or more volumes to a second volume attribute combination-conforming one or more volumes, the first volume attribute combination may be called the "migration-source attribute combination" and the second volume attribute combination may be called the "migration-destination attribute combination". Since the polygonal line denoting a migration trend includes a branched portion, there may be cases where there are multiple migration-destination attribute combinations for one migration-source attribute combination. Furthermore, each volume attribute combination may become either a migration-source attribute combination or a migration-destination attribute combination.

The mark (star) denoting the "selected volume" displayed in the migration trend graph 910 corresponds to a specified migration-source volume. The trend inference program 20322 identifies the location of the migration-source volume in the migration trend based on the attribute combination of the migration-source volume, one or more migration histories (one or more migration histories identified from the history management table 2023) comprising the migration-source volume, and the calculated migration trend. According to the graph 910 of FIG. 11, it is clear that the migration-source volume was the migration destination of a second volume migration in the data flow of the migration that originated with the volume conforming to the media type "SSD" in the storage type "USP_V".

Furthermore, the trend inference program 20322 can infer the migration destination based on the calculated migration trend, and can display the volume attribute combination that conforms to the inferred migration-destination volume. According to the dotted-line arrow in the graph 910, it is clear that a volume conforming to the media type "SAS" in the storage type "USP" has been inferred as the migration destination in a migration (in a fifth migration) that has the volume conforming to the media type "SAS" in the storage type "USP_V" (the volume corresponding to "fourth" in the migration order) as the migration source. The migration destination, for example, may be inferred based on the gradient of the line denoting the migration trend, and the sequence (ranking) of the volume attribute combinations (the specific inference method will be described further below). Higher ranking volume attribute combinations are located at a higher level on the vertical axis of the graph 910, and lower ranking volume attribute combinations are located at a lower level.

The trend-based migration destination plan table 920 denotes multiple plans for selecting a migration-destination volume. A variety of plans can be prepared. In this embodiment, the multiple plans differ in accordance with the number of times a volume has been selected as the migration destination.

As the migration trend, it is supposed that there are first and second migration-destination attribute combinations for the migration-source attribute combination. Then, it is supposed that there are more migrations carried out to the one or more volumes conforming to the second migration-destination attribute combination than there are migrations carried out to the one or more volumes conforming to the first migration-destination attribute combination. In accordance with this, when "Plan A" shown in FIG. 11 is selected, the trend inference program 20322 selects one volume that conforms to the second migration-destination attribute combination as the migration destination. The volume selected as the migration destination comprises a storage capacity of equal to or larger than the migration-source volume storage capacity (or the total amount of migration-target data stored in the migration-source volume).

Migration plan information 930, which is information denoting the migration-destination volume selected with the specified migration-source volume, is displayed in the plan display area 1903. That is, the administrator proposes a migration-destination volume for a migration-source volume via this display area 1903. A volume migration execution button 941 and a reservation screen display button 943 are displayed in this area 1903. When button 941 is pressed, the migration control program 2032 sends a migration instruction, which comprises information (for example, an identifier) denoting the migration-source volume and information denoting the migration-destination volume, to the storage system comprising the migration-source volume (or the storage system comprising the migration-destination volume). The processing performed when button 943 is pressed will be explained further below.

Figure 12:
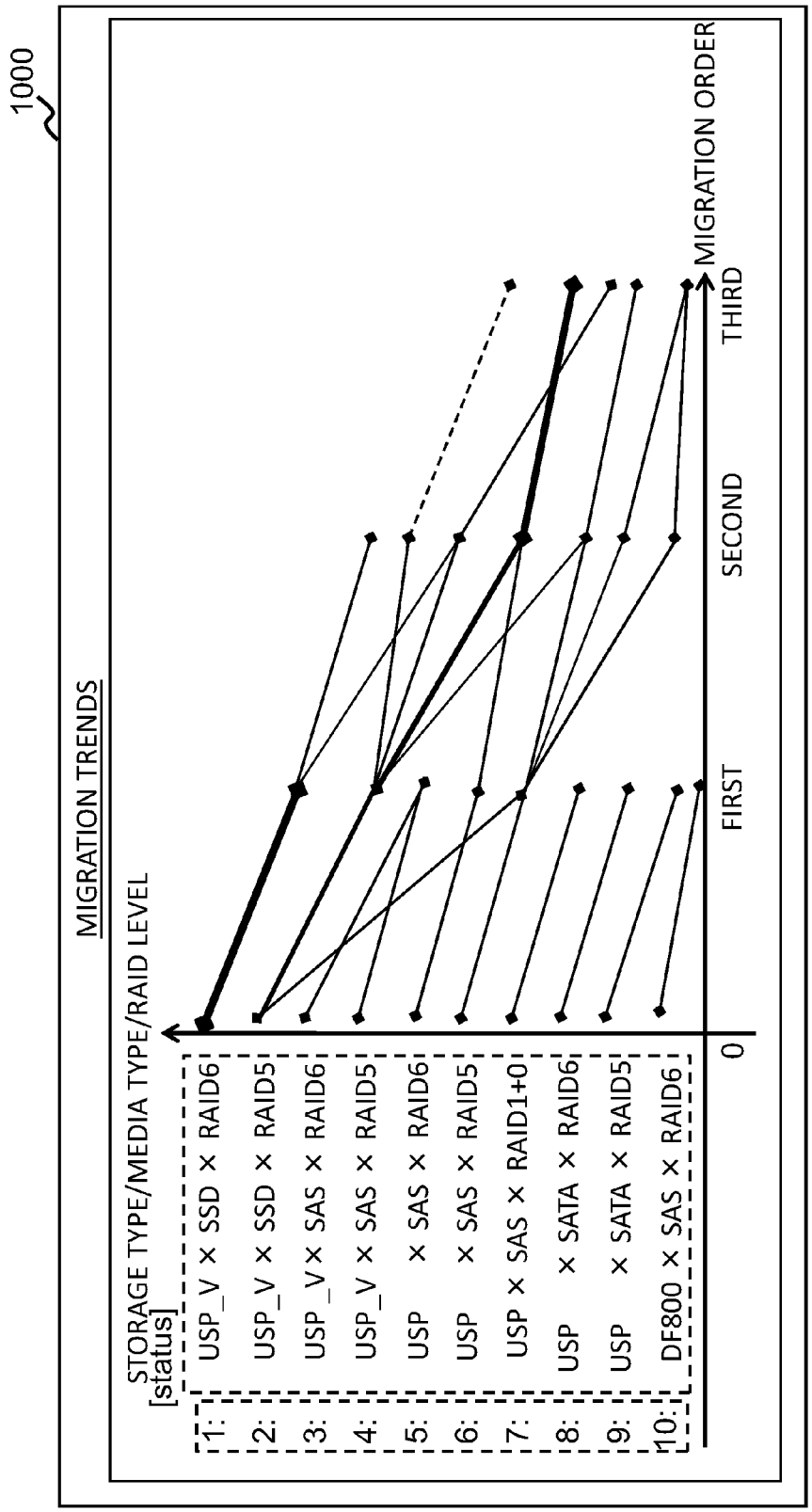
FIG. 12 shows a migration trend graph according to a combination of search conditions that differs from the graph 910 shown in FIG. 11.

FIG. 12 shows a migration trend graph that conforms to search condition combinations that differ from those of the graph 910 shown in FIG. 11.

Similar to the graph 910 described above, the vertical axis of the migration trend graph 1000 corresponds to the ranking of the volume attribute combinations conforming to the search condition combinations, and the horizontal axis corresponds to migration frequency.

The numerical values of the vertical axis denote the rankings of the volume attribute combinations. These rankings are the values denoted by the MG trend ranking 807 of the migration destination inference table 800. The MG trend ranking 807, as was explained hereinabove, is the MG difference (a calculated value obtained by subtracting the number of times a volume attribute combination was a migration destination from the number of times the volume attribute combination was a migration source. Therefore, clearly there is a tendency for a volume attribute combination having a higher MG trend ranking 807 to be readily specified as a migration source but not readily specified as a migration destination, and a tendency for a volume attribute combination having a lower MG trend ranking 807 to be readily specified as a migration destination.

The polygonal lines shown in the migration trend graph 1000 denote migration trends. The terminus of a polygonal line signifies that a migration is not carried out subsequent to the migration order number corresponding to this terminus.

The thickness of a line segment of a polygonal line is a function of the migration frequency. That is, for example, a thicker line segment signifies a larger number of migrations. Specifically, for example, according to the graph 1000 shown in FIG. 12, the fourth ranked migration source attribute combination "USP_V×SAS×RAID 5" has the following migration destination attribute combinations (a) through (c):

(a) sixth-ranked "USP_V×SAS×RAID 6";
(b) seventh-ranked "USP×SAS×RAID 1+0"; and
(c) eighth-ranked "USP×SATA×RAID 6".

The line segment corresponding to the above-mentioned (b) is the thickest. For this reason, it is clear that the one or more volumes conforming to the volume attribute combination of the above-mentioned (b) was/were selected the most often for the migration source attribute combination "USP_V×SAS×RAID 5".

According to the example of FIG. 12, the migration frequency is expressed by the thickness of the line segment, but another method may be used to express this frequency. For example, the line segment may be rendered using a color that conforms to the migration frequency, or a numerical value denoting the migration frequency may be displayed on the line segment.

In the graph 1000, the terminus of the dotted line segment is a volume attribute combination having a high tendency to be selected as the migration destination of a volume, which conforms to the volume attribute combination corresponding to the starting point of this dotted line segment, and is the inferred volume attribute combination.

The administrator is able to discern from the migration trend graph 1000 trends indicating which volume attribute combination will readily become the migration source, and which volume attribute combination-conforming volumes data tends to be migrated from, which volume attribute combination-conforming volumes data tends to be migrated through, and ultimately which volume attribute combination-conforming volumes data tends to be migrated to. Since a volume attribute combination that readily becomes the migration source is located higher and a volume attribute combination that readily becomes the migration destination is located lower, the polygonal lines tend to slant downward toward the right. Therefore, it is easy to create a graph that makes it easy for the administrator to discern migration trends.

Next, the flow of processing for displaying a migration trend will be explained.

Figure 13:
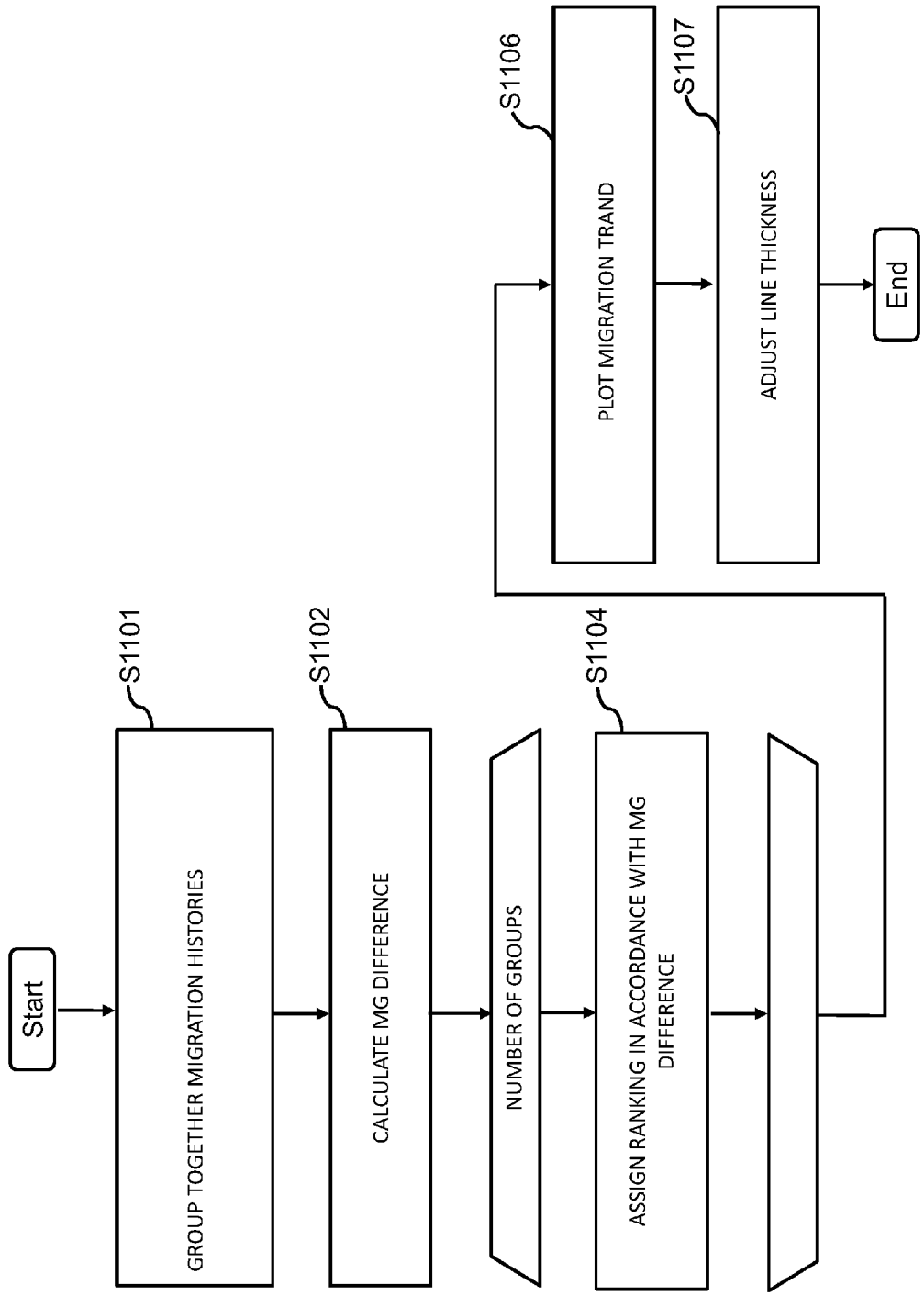
FIG. 13 is a flowchart showing the flow of processing of a migration trend display process.

FIG. 13 is a flowchart showing the flow of a migration trend display process.

The trend inference program 20322 groups together migration histories based on the history management table 2023 and the search condition combination (S1101). That is, the migration trend is calculated.

Next, the trend inference program 20322 calculates the MG difference for the grouped migration histories (S1102). The trend inference program 20322 gives each volume attribute combination conforming to the search condition combination a ranking (a MG trend ranking) according to the size of the MG difference (S1104).

The trend inference program 20322 plots a polygonal line denoting the migration trend calculated in S1101 on the migration trend graph 1000 based on the corresponding relationship between the volume attribute combination and the MG trend ranking (S1106).

Then, the trend inference program 20322 adjusts the thickness of the line segment of the polygonal line in accordance with the number of volume migrations corresponding to this line segment (S1107).

Figure 14:
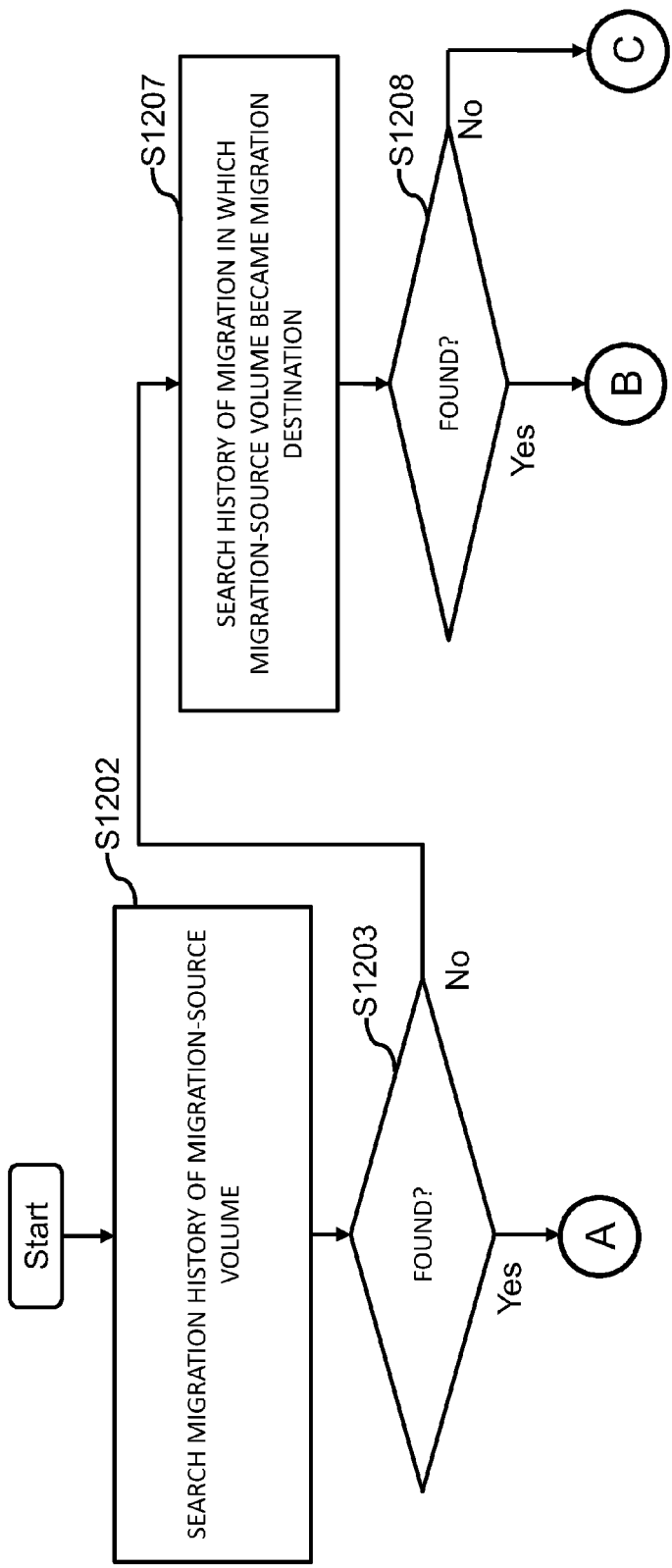
FIG. 14 is a flowchart showing the flow of processing of the first half of a migration destination presentation process.
Figure 15:
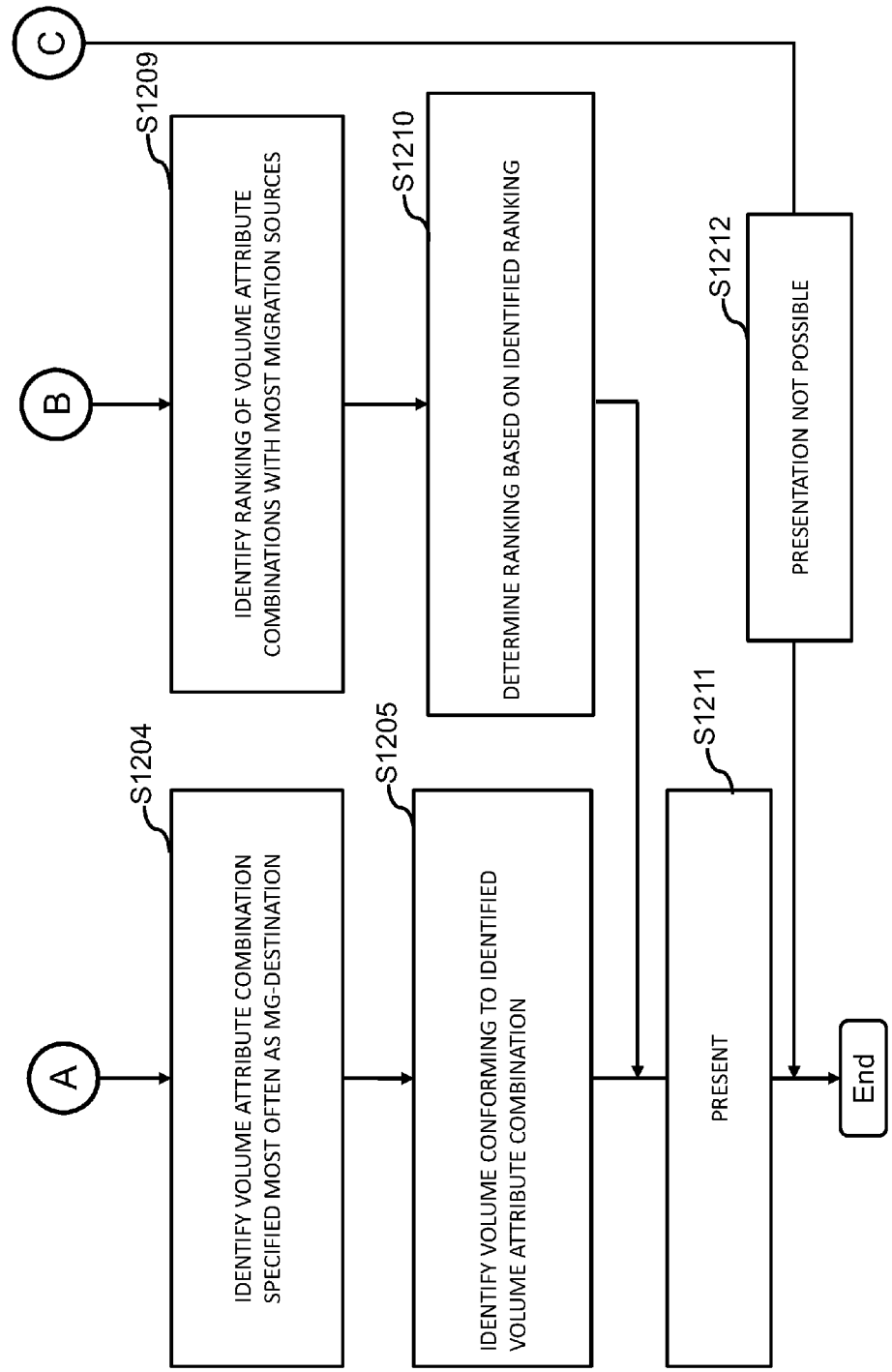
FIG. 15 is a flowchart showing the flow of processing of the second half of a migration destination presentation process.

FIG. 14 is a flowchart showing the flow of processing of the first half of a migration destination presentation process, and FIG. 15 is a flowchart showing the flow of processing of the second half of the migration destination presentation process.

The trend inference program 20322 identifies from the volume history table 2023 one or more migration histories related to the specified migration-source volume. The trend inference program 20322, based on the one or more migration histories and the migration trend calculated in the processing of FIG. 13, searches for a migration history that has as a migration source one or more volumes conforming to the same volume attribute combination as that of the migration source volume (S1202).

In a case where one or more migration histories are found (S1203: YES), the trend inference program 20322 identifies the volume attribute combination of the volume to be used as the migration destination from these one or more migration histories based on the migration destination plan (S1204). For example, in a case where the "Plan A" of FIG. 11 has been selected in S1204, the trend inference program 20322 identifies the volume attribute combination most often selected as the migration destination. Then, the trend inference program 20322 identifies any volume that conforms to the identified volume attribute combination (S1205). The trend inference program 20322 displays information denoting the migration plan that resulted in the volume identified in S1205 becoming the migration destination (S1211).

Alternatively, in a case where not even one migration history has been found (S1203: NO), the trend inference program 20322 searches the history management table 2023 for one or more volume migrations of the migration source at the time when one or more volumes conforming to the volume attribute combination of the migration-source storage was/were the migration destination (S1207).

In a case where one or more volume migrations are found (S1208: YES), the trend inference program 20322 identifies, based on the volume management table 2022 and the history management table 2023, the volume attribute combination that has most often become the migration source in these one or more volume migrations. The trend inference program 20322 identifies the ranking (the MG trend ranking) of this volume attribute combination (S1209).

The trend inference program 20322 calculates the difference between the identified ranking and the ranking corresponding to the volume attribute combination of the migration-source storage, and adds the calculated ranking to the ranking corresponding to the volume attribute combination of the migration-source storage. Then, the trend inference program 20322 identifies the volume that conforms to the volume attribute combination corresponding to the added ranking (S1210). The trend inference program 20322 displays information denoting the volume migration plan of the migration-destination volume identified in S1210 (S1211). Furthermore, in the case of a YES in S1208, the volume migration plan need not be displayed. For example, the line segment, which couples the point that corresponds to the volume attribute combination corresponding to the above-mentioned added ranking and the point that corresponds to the volume attribute combination of the migration-source volume, may simply be displayed as a dotted line. That is, information, which denotes the volume attribute combination that was inferred from past volume trends and which has the highest tendency for being selected as the migration destination, may be displayed.

In a case where not even one volume migration is found (S1208: NO), the trend inference program 20322 may display a message denoting that a migration destination proposal is not possible (S1212).

According to the embodiment described hereinabove, even when conditions that cannot be quantified, such as a storage type and a media type, are included in a combination of search conditions specified by the administrator (a combination of migration destination conditions), a ranking is assigned to each volume attribute condition conforming to this search condition combination. This ranking (MG trend ranking) is configured based on the size of a MG difference (a value calculated by subtracting the number of times one or more volumes conforming to a volume attribute condition became the migration destination from the number of times that one or more volumes conforming to this volume attribute condition became the migration source). Then, a migration trend is calculated from multiple migration histories, and a migration-destination volume is proposed based on this migration trend, the MG trend ranking of each volume attribute combination, and the volume attribute combination of the specified migration-source volume. Therefore, according to this embodiment, an unquantifiable condition can be used as a migration destination condition, and, in addition, the load on the administrator can be reduced even when there are multiple migration destination conditions.

Furthermore, the MG trend ranking may be a ranking that is based on a value other than the MG difference, for example, a value that is calculated based on the number of times that one or more volumes conforming to a volume attribute condition has become the migration source and the number of times that one or more volumes conforming to this volume attribute condition has become the migration destination.

Now then, up to this point, the calculation of a volume trend and the proposal of a migration-destination volume have been explained as processes that are carried out by the management computer 20, but, in this embodiment, the management computer 20 is also able to apply these processes to carry out the following controls.

Volume advanced reservation

Storage resource usage presentation

An advanced reservation and a storage resource usage presentation will be explained below.

<Volume Advanced Reservation>

An advanced reservation program 20323 carries out a volume advanced reservation. In accordance with this process, a migration-destination volume can be reserved prior to executing a volume migration. The reserved volume, provided the reservation is not cancelled, cannot be used in an application other than the destination of a migration from the migration-source volume of this volume. Therefore, the volume advanced reservation is able to prevent a situation in which a volume migration cannot be executed because there is no migration-destination volume.

The volume advanced reservation process, for example, is executed when the reservation screen display button 943 shown in FIG. 11 has been pressed. When this button 943 is pressed, the volume advanced reservation process is carried out, and a screen (an advanced reservation screen) showing the result thereof is displayed on the display computer 10.

Figure 16:
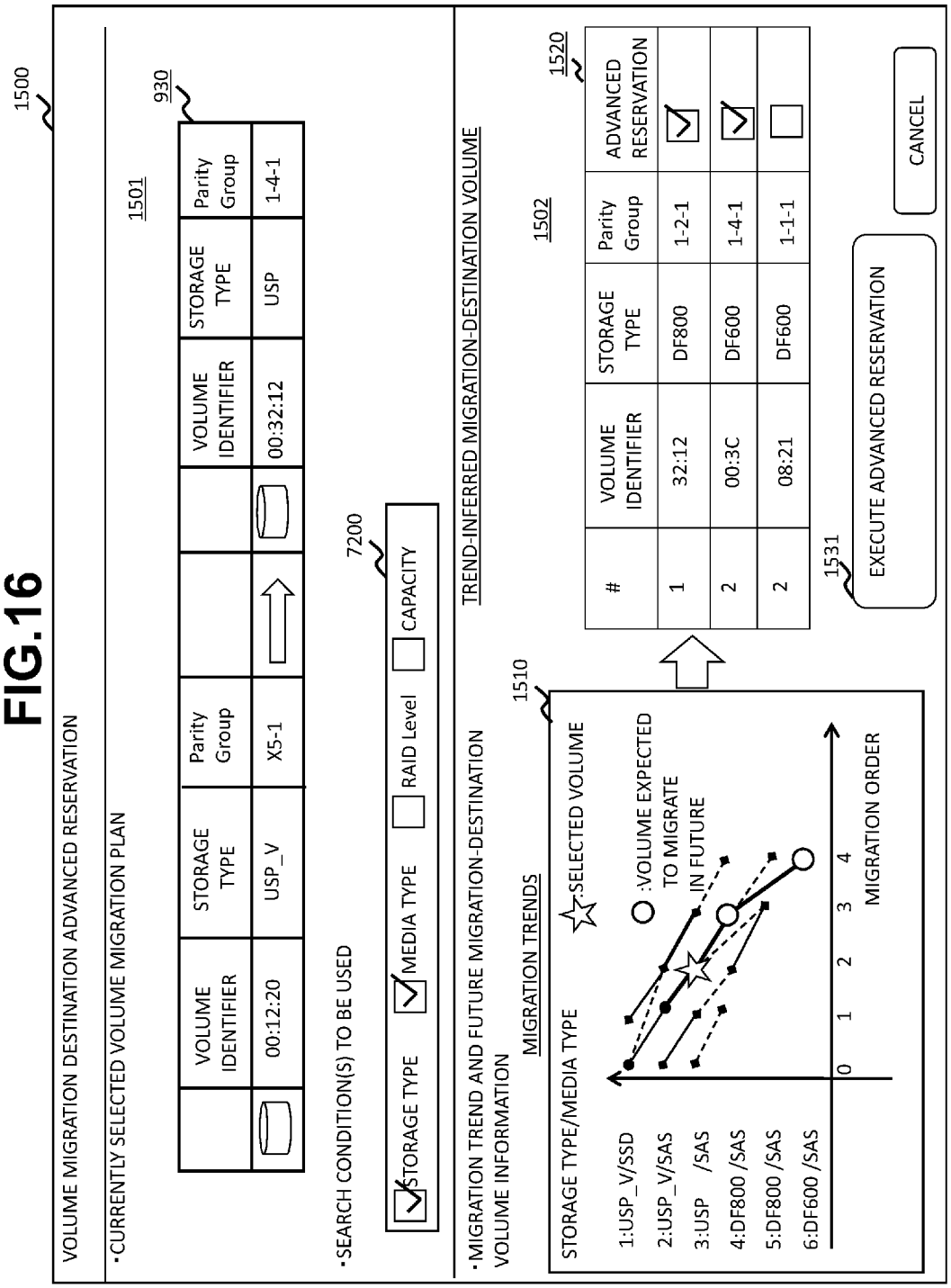
FIG. 16 shows an advanced reservation screen.

FIG. 16 shows the advanced reservation screen.

The advanced reservation screen 1500 comprises a plan display area 1501 and a reservation display area 1502.

The migration plan information 930 that was displayed in the plan display area 1903 shown in FIG. 11, and information 7200 denoting the search condition combination specified by the administrator for searching for a migration destination are displayed in the plan display area 1501.

A graph 1510 showing migration trends, a list 1520 of volumes that have been inferred from the migration trends as migration destinations, and an advanced reservation execution button 1531 are displayed in the reservation display area 1502.

In the graph 1510, a mark (a star), which denotes a migration-source volume, is displayed the same as in the graph 910 shown in FIG. 11. Specifically, the trend inference program 20322, based on the calculated migration trends and the migration history of the migration-source volume, identifies the data stored in the migration-source volume as being data that has been migrated in accordance with a certain number of volume migrations in a certain migration trend, and displays the mark (star) denoting the migration-source volume in the location that corresponds to the identified migration order number and the identified migration trend.

The migration-destination volume is inferred in accordance with the migration trend to which the migration-source volume belongs. In a case where the migration-source volume was the migration destination in an $n^{th}$ (where n is a natural number) volume migration, the inferred migration-destination volume will be the migration destination in a volume migration that is carried out the time after the $n^{th}$ volume migration. In this embodiment, the volume attribute combination having the largest number of migrations with respect to the volume attribute combination of the migration-source volume is inferred as the migration-destination attribute combination. Multiple migration-destination attribute combinations may also be inferred as the migration destination of the volume migration after the $n^{th}$ volume migration. The multiple migration-destination attribute combinations may comprise at least one of a migration-destination attribute combination of a n+1 volume migration, or a migration-destination attribute combination of a n+2 and later volume migration. The advanced reservation program 20323 (or a program that is executed by the display computer 10) displays at a location corresponding to the volume attribute combination inferred as the migration destination on the polygonal line (graph 1510), which denotes the volume trend to which the migration-source volume belongs, a mark (for example, a circle) signifying that this migration destination is the migration-destination attribute combination.

The list 1520 comprises information denoting the volumes that conform to the inferred migration-destination attribute combination, and a tool (for example, a checkbox) for selecting an administrator-desired volume. A volume is specified by specifying the tool (for example, the checkbox) that corresponds to the administrator-desired volume. Then, in a case where the advanced reservation execution button 1531 is pressed, the advanced reservation program 20323 reserves (secures) the specified volume as the migration-destination volume of the volume migration that conforms to the volume trend to which the migration-source volume belongs.

FIG. 17 is a flowchart showing the flow of the volume advanced reservation process.

First, the advanced reservation program 20323, based on the migration trend to which the specified migration-source volume belongs and the volume management table 2022, searches for all the migration-destination volumes derived from the migration-source volume (S1601). "All the migration-destination volumes derived from the migration-source volume" are the volumes that conform to all the conditions listed below:

conform to the volume attribute combination corresponding to the time after the migration order number corresponding to the volume attribute combination to which the migration-source volume belongs; and conform to the volume attribute combination that belongs to the migration trend to which the migration-source volume belongs.

Next, the advanced reservation program 20323 identifies the route (polygonal line) having the largest number of migrations from the migration-source attribute combination (the volume attribute combination of the migration-source volume) in the migration trend to which the migration-source volume belongs. Then, the advanced reservation program 20323 narrows the multiple volumes found in accordance with the search of S1601 to one or more volumes that conform to the one or more migration-destination attribute combinations belonging to the identified route (S1602 and S1603).

The advanced reservation program 20323 displays the list 1520 (refer to FIG. 16) comprising information denoting the narrowed-down one or more volumes. In a case where a volume is specified from this list 1520 and an advanced reservation execution is instructed, the advanced reservation program 20323 reserves (secures) the specified volume (S1604).

<Storage Resource Usage Presentation>

A storage resource usage presentation makes it possible to identify a storage resource (a volume attribute combination) that is used often, and a storage resource that is not used very often.

FIG. 18 shows a usage presentation screen.

The usage presentation screen 1700 is displayed on the display computer 10 by the usage program 20324.

This screen 1700 comprises a condition display area 1701, a trend display area 1702, and a usage display area 1703.

The condition display area 1701 comprises a tool group 1711 comprising multiple tools (for example, checkboxes) for respectively specifying multiple search conditions, and a computation execution button 1712.

A graph 1720 showing migration trends is displayed in the trend display area 1702.

Information denoting storage resource usage is displayed in the usage display area 1703. This information, for example, includes migration destination condition ranking information 1731, migration source condition ranking information 1732, and unused condition ranking information 1733.

When a tool group 1711 tool corresponding to an administrator-desired search condition is specified (that is, when a search condition combination comprising one or more administrator-desired search conditions is specified) and the execute computation button 1712 is pressed, a migration trend is calculated and a graph 1720 is displayed. Information, which corresponds to multiple volume attribute combinations corresponding to a search condition combination, is listed up along the vertical axis of the graph 1720.

The list of multiple volume attribute combinations along the vertical axis of the graph 1720 is in descending order of MG trend rankings. The MG trend ranking is a ranking in accordance with MG differences.

The usage program 20324 gives rankings to multiple volume attribute combinations in accordance with elements other than the MG differences. The results of this are the information 1731 through 1733 displayed in the usage display area 1703.

According to the information 1731, a ranking is given to volume attribute combinations from the standpoint of the migration destination. From this standpoint, the volume attribute combination ranking conforms to the number of times (MG-destination specification frequency) that the volume attribute combination has been specified as the migration destination. A volume attribute combination with a higher specification frequency is assigned a higher ranking. The higher the ranking of the volume attribute combination (storage resource), the more likely this resource will have a large storage capacity for use. This is because a migration destination must be able to take in and store data.

According to the information 1732, a ranking is given to volume attribute combinations from the standpoint of the migration source. From this standpoint, the volume attribute combination ranking conforms to the number of times (MG-source specification frequency) that the volume attribute combination has been specified as the migration source. A volume attribute combination with a higher specification frequency is given a higher ranking. The higher the ranking of the volume attribute combination (storage resource), the more likely this resource will have a small storage capacity for use. This is because the migration source outputs data until there is no data left.

According to the information 1733, a ranking is given to volume attribute combinations from the standpoint of the number of migrations. From this standpoint, the volume attribute combination ranking conforms to the number of at least one of the MG-source specification frequency or the MG-destination specification frequency (for example, the total of these). A volume attribute combination with a lower specification frequency is given a higher ranking. The higher the ranking of the volume attribute combination (storage resource), the more likely this resource will have a small storage capacity for use.

The table 800 shown in FIG. 8 is created for calculating a volume trend, and the MG-source specification frequency and MG destination specification frequency are registered in the table 800 for each volume attribute combination. Therefore, the information 1731 and 1732 is created by the usage program 20324 on the basis of the MG-source specification frequency and MG destination specification frequency for each volume attribute combination in the table 800.

The embodiments of the present invention have been explained hereinabove, and these embodiments are examples for explaining the present invention and do not purport to limit the scope of the present invention solely to these embodiments. That is, the present invention can also be put into practice in a variety of other modes.

For example, the management computer 20 proposes a migration-destination volume based on a migration trend, but instead of this, a migration-destination volume may be decided automatically based on the migration trend and a prescribed migration destination selection policy. The migration destination selection policy, for example, may be at least one of (a) and (b) below:
(a) one of the plans A through C shown in FIG. 11; and
(b) in a case where the volume attribute combination of the migration-source volume is the same as the volume attribute combination corresponding to the end of a polygonal line, the volume conforming to the volume attribute combination inferred as the migration destination is decided on as the migration destination.

Furthermore, for example, not all of the migration trend polygonal lines need to be displayed in the migration trend graph. For example, at a minimum, the polygonal line denoting the migration trend to which the volume attribute combination of the migration-source volume belongs may be displayed.

Furthermore, for example, the migration trend may be expressed using a method other than a polygonal line.

REFERENCE SIGNS LIST

10 Host
20 Management computer
60 Storage system

The invention claimed is:
1. A migration destination decision support method which is a method for supporting a decision on a storage device as a data migration destination, comprising the steps of:
(A) including, each time data is migrated from a migration-source storage device in one or more storage systems comprising multiple storage devices to a migration-destination storage device in the one or more storage systems, information serving as information denoting a migration history related to this data migration and comprising origin identification information which is identification information corresponding to a migration origin being a storage device that is a migration source at the time of a first migration of this data, information related to a migration-source storage device of this data migration, and information related to a migration-destination storage device of this data migration, in history management information which comprises information denoting multiple migration histories;
(B) specifying the migration-source storage device;
(C) receiving an input of a combination of attribute conditions, which are conditions related to one or more administrator-desired device attributes, for the migration-destination storage device;
(D) identifying, based on storage device management information comprising information denoting multiple device attributes for each storage device, all device attribute combinations, which are one or more device attributes that conform to the attribute condition combination that has been inputted in the (C);
(E) calculating, based on the history management information and all of the device attribute combinations identified in the (D), migration trends denoting migrations that have been carried out from one or more storage devices that conform to one of the device attribute combinations to one or more storage devices that conform to another one of the device attribute combinations, for multiple migration origins;
(F) identifying, from among multiple migration trends calculated for the multiple migration origins, a migration trend to which the specified migration-source storage device belongs, based on the multiple migration trends, the device attribute combination of the specified migration-source storage device, and the migration history related to the migration-source storage device, which is identified from the history management information; and
(G) displaying information denoting at least the migration trend identified in the (F) from among the multiple migration trends.
2. A migration destination decision support method according to claim 1, wherein, in the (E):
(e1) a MG-source frequency, which is the number of times that the storage device becomes a migration source, and a MG-destination frequency, which is the number of times that the storage device becomes a migration des- tination, are calculated for each device attribute combination identified in the (D) based on the history management information;

(e2) a MG difference, which is a value obtained by subtracting the MG-destination frequency from the MG-source frequency, is calculated for each device attribute combination identified in the (D); and (e3) a ranking is given to each device attribute combination such that a larger MG difference results in a higher ranking, and in the (G), information denoting at least the migration trend identified in the (F) is displayed on the basis of the ranking of each device attribute combination.

3. A migration destination decision support method according to claim 2, wherein the administrator-desired one or more device attributes include, as device attributes that cannot be expressed as numerical values, at least one of a storage type which is a type of the storage system, a media type which is a type of physical storage media forming the basis of a storage device, and a RAID level of a parity group which comprises multiple storage media and forms the basis of a storage device, and each storage device is either a parity group or a logical volume that is based on a parity group.

4. A migration destination decision support method according to claim 3, wherein:

(P) in a case where the device attribute combination of the specified migration-source storage device corresponds to a device attribute combination at a terminal end of the migration trend identified in the (F), a device attribute combination of a storage device to be a migration destination when the storage device of this device attribute combination at the terminal end is the migration source, is inferred based on the migration trend identified in the (F).

5. A migration destination decision support method according to claim 4, wherein:

(X) one or more device attribute combinations of one or more storage devices that can be migration destinations in the future are inferred based on the migration trend identified in the (F); and (Y) at least one of one or more storage devices conforming to the inferred one or more device attribute combinations is reserved as a future migration-destination storage device.

6. A migration destination decision support method according to claim 5, further comprising the steps of:

(H) giving a ranking to each device attribute combination such that a larger MG source frequency results in a higher ranking, and displaying information denoting the device attribute combinations in descending order of the ranking; and (I) giving a ranking to each device attribute combination such that a larger MG destination frequency results in a lower ranking, and displaying information denoting the device attribute combinations in descending order of the ranking.

7. A management system comprising:

a communication interface apparatus coupled to one or more storage systems comprising multiple storage devices;

a storage resource, which stores history management information including information denoting multiple migration histories, and storage device management information including information denoting multiple device attributes of a storage device; and a processor coupled to the communication interface apparatus and the storage resource, wherein the processor:

(A) includes, each time data is migrated from a migration-source storage device in the one or more storage systems to a migration-destination storage device in the one or more storage systems, information serving as information denoting a migration history related to this data migration and comprising origin identification information which is identification information corresponding to a migration origin being a storage device that is a migration source at the time of a first migration of this data, information related to a migration-source storage device of this data migration, and information related to a migration-destination storage device of this data migration, in the history management information;

(B) specifies the migration-source storage device;

(C) receives an input of a combination of attribute conditions, which are conditions related to one or more administrator-desired device attributes, for the migration-destination storage device;

(D) identifies, based on the storage device management information, all device attribute combinations, which are one or more device attributes that conform to the attribute condition combination that has been inputted in the (C);

(E) calculates, based on the history management information and all of the device attribute combinations identified in the (D), migration trends denoting migrations that have been carried out from one or more storage devices that conform to one of the device attribute combinations to one or more storage devices that conform to another one of the device attribute combinations, for multiple migration origins;

(F) identifies, from among multiple migration trends calculated for the multiple migration origins, a migration trend to which the specified migration-source storage device belongs, based on the multiple migration trends, the device attribute combination of the specified migration-source storage device, and the migration history related to the migration-source storage device, which is identified from the history management information; and (G) displays information denoting at least the migration trend identified in the (F) from among the multiple migration trends.

8. A management system according to claim 7, wherein, in the (E), the processor:

(e1) calculates a MG-source frequency, which is the number of times that the storage device becomes a migration source, and a MG-destination frequency, which is the number of times that the storage device becomes a migration destination, for each device attribute combination identified in the (D) based on the history management information;

(e2) calculates a MG difference, which is a value obtained by subtracting the MG-destination frequency from the MG-source frequency, for each device attribute combination identified in the (D); and (e3) gives a ranking to each device attribute combination such that a larger MG difference results in a higher ranking, and Displays, in the (G), information denoting at least the migration trend identified in the (F) on the basis of the ranking of each device attribute combination.

9. A management system according to claim 8, wherein, in the (G), the processor displays a polygonal line denoting the migration trend in a graph having a vertical axis on which multiple device attribute combinations are arranged in descending order by ranking, and a horizontal axis indicating a migration order sequence.

10. A management system according to claim 9, wherein at least display modes of line segments subsequent to branching in the polygonal line differ according to a migration frequency, and the migration frequency is the number identified based on the history management information.

11. A management system according to claim 7, wherein the administrator-desired one or more device attributes include, as device attributes that cannot be expressed as numerical values, at least one of a storage type which is a type of the storage system, a media type which is a type of physical storage media forming the basis of a storage device, and a RAID level of a parity group which comprises multiple storage media and forms the basis of a storage device, and each storage device is either a parity group or a logical volume that is based on a parity group.

12. A management system according to claim 7, wherein:
(P) in a case where the device attribute combination of the specified migration-source storage device corresponds to a device attribute combination at a terminal end of the migration trend identified in the (F), a device attribute combination of a storage device to be a migration destination when the storage device of this device attribute combination at the terminal end is the migration source, is inferred based on the migration trend identified in the (F).

13. A management system according to claim 12, wherein, in the (P), the processor:
(p1) searches for, based on the history management information, one or more migration-source storage devices when one or more storage devices conforming to the device attribute combination at the terminal end are the migration destinations;
(p2) identifies, based on the storage device management information and the history management information, a device attribute combination that has been most often the migration source from among one or more device attribute combinations corresponding to the one or more storage devices that have been found; and
(p3) infers, as the device attribute combination of the storage device to be a migration destination, the device attribute combination having a ranking corresponding to the sum of the ranking of the device combination identified in the (p2), and the ranking of the device attribute combination at the terminal end.

14. A management system according to claim 7, wherein:
(X) one or more device attribute combinations of one or more storage devices that can be migration destinations in the future is inferred based on the migration trend identified in the (F); and
(Y) at least one of one or more storage devices conforming to the inferred one or more device attribute combinations is reserved as a future migration-destination storage device.

15. A management system according to claim 7, wherein the processor:
(H) calculates a MG-source frequency, which is the number of times that the storage device becomes a migration source, and a MG-destination frequency, which is the number of times that the storage device becomes a migration destination, for each device attribute combination identified in the (D) based on the history management information; and
(I) displays information denoting device attribute combinations in descending order of the ranking given to each device attribute combination such that a larger MG source frequency results in a higher ranking, and information denoting the device attribute combinations in descending order of the ranking given to each device attribute combination such that a larger MG destination frequency results in a lower ranking.

* * * * *